(12) United States Patent
Lipka et al.

(10) Patent No.: US 10,489,513 B2
(45) Date of Patent: Nov. 26, 2019

(54) WEB APPLICATION LOCALIZATION

(71) Applicant: salesforce.com, inc., San Francisco, CA (US)

(72) Inventors: Hendrik Lipka, Jena (DE); Cornelia Sittel, Arlington, MA (US)

(73) Assignee: salesforce.com, inc., San Francisco, CA (US)

( * ) Notice: Subject to any disclaimer, the term of this patent is extended or adjusted under 35 U.S.C. 154(b) by 147 days.

(21) Appl. No.: 15/491,952

(22) Filed: Apr. 19, 2017

(65) Prior Publication Data

US 2018/0307683 A1    Oct. 25, 2018

(51) Int. Cl.

| | |
|---|---|
| G06F 17/28 | (2006.01) |
| G06F 17/27 | (2006.01) |
| G06F 17/22 | (2006.01) |
| G06F 8/38 | (2018.01) |
| G06F 11/36 | (2006.01) |
| G06F 9/451 | (2018.01) |
| G06F 16/958 | (2019.01) |

(52) U.S. Cl.
CPC .......... *G06F 17/2854* (2013.01); *G06F 8/38* (2013.01); *G06F 9/454* (2018.02); *G06F 11/3608* (2013.01); *G06F 11/3692* (2013.01); *G06F 16/986* (2019.01); *G06F 17/2229* (2013.01); *G06F 17/2247* (2013.01); *G06F 17/2288* (2013.01); *G06F 17/2725* (2013.01)

(58) Field of Classification Search
CPC .......... G06F 9/44589; G06F 11/3664; G06F 11/3684; G06F 11/3688; G06F 17/2854; G06F 16/986; G06F 9/454; G06F 17/2229; G06F 11/3692; G06F 17/2247; G06F 17/2725; G06F 8/38; G06F 17/2288; G06F 11/3608

See application file for complete search history.

(56) References Cited

U.S. PATENT DOCUMENTS

| | | | |
|---|---|---|---|
| 5,797,011 | A | 8/1998 | Kroll et al. |
| 7,996,417 | B2 | 8/2011 | Travieso et al. |
| 9,128,918 | B2 | 9/2015 | Travieso et al. |
| 9,684,653 | B1 | 6/2017 | Bhagat |
| 9,690,549 | B2 * | 6/2017 | Zaiwei ............... G06F 9/454 |
| 10,229,115 | B2 | 3/2019 | Li et al. |
| 2002/0052893 | A1 | 5/2002 | Grobler et al. |

(Continued)

OTHER PUBLICATIONS

"Why AdaptiveMT is the Dawn of a New Horizon for Machine Translation", AdaptiveMt, introduced in SDL Trados Studio 2017, https://www.sdltrados.com/download/adaptivemt-white-paper/119968/, pp. 1-2.

(Continued)

*Primary Examiner* — Benjamin C Wu

(74) *Attorney, Agent, or Firm* — Sterne, Kessler, Goldstein & Fox P.L.L.C.

(57) ABSTRACT

Disclosed herein are systems and methods for translating elements in a web application via localization and internalization techniques and tools. By employing these techniques and tools, developers can deliver translated applications of higher linguistic quality providing seamless native experiences for users of the applications across the globe. The techniques conserve development resources, allow multiple languages to be released simultaneously, and provide for post-release code updates.

25 Claims, 23 Drawing Sheets

(56) References Cited

U.S. PATENT DOCUMENTS

| | | | |
|---|---|---|---|
| 2002/0144253 A1 | 10/2002 | Kumhyr | |
| 2002/0162093 A1 | 10/2002 | Zhou et al. | |
| 2004/0049374 A1 | 3/2004 | Breslau et al. | |
| 2004/0128614 A1 | 7/2004 | Andrews et al. | |
| 2004/0167768 A1 | 8/2004 | Travieso et al. | |
| 2008/0133216 A1 | 6/2008 | Togami | |
| 2008/0221868 A1 | 9/2008 | Melnick et al. | |
| 2009/0024936 A1 | 1/2009 | Ragan | |
| 2009/0030674 A1* | 1/2009 | Chakra | G06F 9/454 704/8 |
| 2009/0089758 A1 | 4/2009 | Chen et al. | |
| 2010/0023735 A1 | 1/2010 | Moyer | |
| 2010/0042929 A1 | 2/2010 | Berry et al. | |
| 2010/0088085 A1 | 4/2010 | Jeon et al. | |
| 2010/0211827 A1 | 8/2010 | Moyer et al. | |
| 2011/0010162 A1 | 1/2011 | Elgazzar et al. | |
| 2013/0290075 A1* | 10/2013 | Kathooria | G06Q 10/06395 705/7.41 |
| 2013/0290933 A1* | 10/2013 | He | G06F 11/3668 717/124 |
| 2015/0088484 A1 | 3/2015 | Bostick et al. | |
| 2015/0324336 A1* | 11/2015 | Glezos | G06F 17/2247 715/234 |
| 2016/0092440 A1 | 3/2016 | Bhuvaneswaran | |
| 2016/0127418 A1* | 5/2016 | Maes | H04L 41/5048 726/1 |
| 2016/0139914 A1* | 5/2016 | Levi | G06Q 10/00 717/121 |
| 2016/0283204 A1* | 9/2016 | Zaiwei | G06F 9/454 |
| 2017/0083512 A1* | 3/2017 | Bangarambandi | G06F 9/454 |
| 2017/0322944 A1 | 11/2017 | Farr et al. | |
| 2018/0137025 A1* | 5/2018 | Zhang | G06F 11/3608 |
| 2018/0300218 A1 | 10/2018 | Lipka et al. | |

OTHER PUBLICATIONS

"Not all TMs are Equal: Why upLIFT has Transformed Translation Memory", upLIFT, introduced in SDL Trados Studio 2017, https://www.sdltrados.com/download/uplift-white-paper/118721/, pp. 1-2.

Jenner, "Let's Talk About Pricing for Freelance Translation Work", 2017 SDI plc, pp. 1-4.

Greenfield, "How to Set Freelance Translation Rates", 2017 SDI plc, pp. 1-5.

Jenner, "Conflict and Resolution: Tricky Situations and Unreasonable Customers", 2017, SDL plc, pp. 1-4.

Stockley, "Grow Your Freelance Translation Business with Twitter", 2017 SDL plc, pp. 1-8.

Stockley, "The Freelance Transators' Guide to Using LinkedIn", 2017 SDL plc, pp. 1-7.

Stockley, "Setting up a Freelance Translation Website", 2017 SDL plc, pp. 1-8.

Jenner, "Habits of Highly Successful Translators and Interpreters", 2017 SDL plc, pp. 1-4.

Greenfield, "Ramping Up Your Freelance Translation Business", 2017 SDL plc, pp. 1-5.

"SDL Trados GroupShare 2017", Language White Paper, 2017 SDL plc, pp. 1-12.

Robinson, "How does Alexika select freelance translators to work on projects—what are we looking for", 2017 SDL plc, pp. 1-5.

"Big Data and Text Analytics: Solving the Missing Big Language" Link, Jan. 2013 SDL pic, pp. 1-8.

"Modern Translation Guide, A Roadmap to Radially Simplified Translation", 2014 SDL plc, pp. 1-8.

Kelly, "How You Can Win More Freelance Translation Work", SDL 2013, pp. 1-6.

Greenfield, "Attracting and Retaining Top Linguists", SDL 2013, pp. 1-5.

Jenner, "5 Habits of Highly Successful People: Customer Interaction", SDL 2013, pp. 1-4.

"Terminology Management", 2014 SDL plc, www.sdl.com/terminology, pp. 1-24.

"SDL Trados Studio Professional for LSPs and Corporations", 2016 SDL plc, pp. 1-4.

"SDL* Trados GroupShare", 2017 SDL plc, pp. 1-8.

Crowle, S and Hole, L., "ISML: An interface specification meta-language", International Workshop on Design, Specification, and Verification of Interactive Systems, Jun. 11, 2003, pp. 362-376. (SALE 1208-1).

Extended European Search Report issued in European Application No. 18167940.8, dated Sep. 10, 2018, 9 pages.

* cited by examiner

```
Properties files: /Users/pmaskar/source/BigR/17.2/Loc_Kit_033_Sanitized/lockit_20170811/full
Permitted key types names: tabs, tab, button, buttons, title, titles, field, fields, breadcrumb, breadcrumbs, description, descriptions,
error, errors, info, action, actions, label, labels, select, msg, message, messages, header, headers, heading, check, radio, column,
columns, link, links, tooltip, tooltips, wspi Verifying presence of permitted key type in keys in language pack - properties files
   metadata.properties
      Key : objecttypeattrselpopup.warning.products.mixed.catalogs [no permitted key type found]
      Key : objecttypeattrselpopup.warning.products.mixed.catalogs [no permitted key type found]
      Key : objecttypeattributelist.breadcrumb2 [no permitted key type found]
      Key : objecttypeattribute.confirm.change.value.type [no permitted key type found]
476 ──Key : objecttypeattributelist.text.deprecated [no permitted key type found]
      Key : objecttypestrselpopup.warning.categories.mixed.catalogs [no permitted key type found]
   priceadjustmentlimits.properties
      Key : add.amount.hover [no permitted key type found]
      Key : add.amount.hover [no permitted key type found]
      Key : add.amount.placeholder [no permitted key type found]
      Key : add.type.item [no permitted key type found]
      Key : add.type.hover [no permitted key type found]
      Key : add.unit.hover [no permitted key type found]
      Key : add.type.order [no permitted key type found]
      Key : add.type.shipping [no permitted key type found]
   catalog.properties
      Key : cqsclientfeedsettings.text.running [no permitted key type found]
      Key : cqsclientfeedsettings.text.running [no permitted key type found]
      Key : powerreviewsfeedsettings.alt.refresh [no permitted key type found]
      Key : cqsclientfeedsettings.threshold.success [no permitted key type found]
      Key : categoryassignconfig.text.value.missing [no permitted key type found]
      Key : catalogcatsselpopup.alert [no permitted key type found]
```

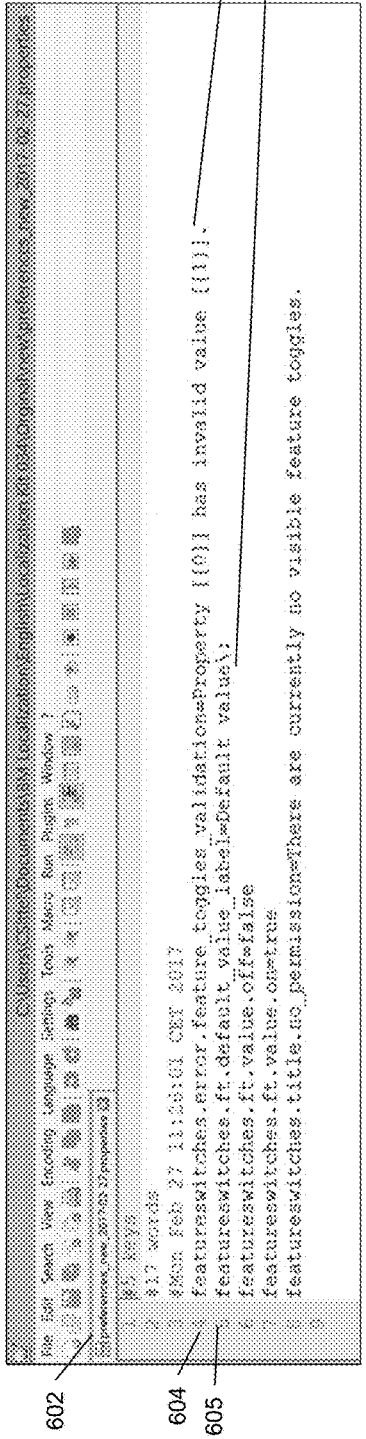

```
Target directory:
  Target Pack: /Users/pnaskar/source/l10n/17.2/Loc Kit 033 Translations/JA
Source directories
  FULL:   /Users/pnaskar/source/l10n/17.2/Loc Kit 033 Sanitized/lockit_20170131/full
  CHANGE: /Users/pnaskar/source/l10n/17.2/Loc Kit 033 Sanitized/lockit_20170131/changed
  NEW:    /Users/pnaskar/source/l10n/17.2/Loc Kit 033 Sanitized/lockit_20170131/new Comparing number of files in - Target Pack vs. FULL
  Number of files in Target Pack is: 108       765
  Number of files in FULL is: 112
Comparing files in direction - Target Pack vs. FULL
  No difference found
Comparing keys in direction across language packs - FULL vs. Target Pack  ⎫
  No difference found                                                      ⎪
Comparing keys in direction across language packs - CHANGE vs. Target Pack⎪
  No difference found                                                      ⎪
Comparing keys in direction across language packs - NEW vs. Target Pack   ⎬ 776
  No difference found                                                      ⎪
Comparing parameters in values across language packs (ignoring order) - FULL vs. Target Pack
  No difference found                                                      ⎪
Comparing parameters in values across language packs (ignoring order) - CHANGE vs. Target Pack
  No difference found                                                      ⎪
Comparing parameters in values across language packs (ignoring order) - NEW vs. Target Pack
  No difference found                                                     ⎭
```

WEB APPLICATION LOCALIZATION

RELATED APPLICATION

This application is related to U.S. patent application Ser. No. 15/490,852 entitled "Natural Language Translation and Localization," filed on Apr. 18, 2017, which is herein incorporated by reference in its entirety.

FIELD OF DISCLOSURE

The field of disclosure relates to accurate translation of elements in a web application via internationalization (I18n) and localization (L10n)—enabling applications to handle to different languages, regional differences and technical requirements of a target market locale. Internationalization is the process of designing a software application so that it can be adapted to various languages and regions. Localization is the process of adapting internationalized software for a specific region or language by adding locale-specific components and translating text.

The methods disclosed include managing digital data for a plurality of tenants to software instances, each tenant of the plurality of tenants comprising a group of users who share a common access with a specific set of privileges to a software instance of at least one application.

INTRODUCTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

In today's world, web applications that serve and manage millions of Internet users are faced with the challenge of delivering applications globally, in the languages needed by end users—providing efficient, usable platforms for interactions and user experiences.

Web application developers often focus almost exclusively on the development of features for a platform, and are unfamiliar with requirements for internationalization and localization of the platform being developed. Often, little thought is given to designing a software application so that it can be adapted to various languages and regions without engineering changes to handle different languages and locales. Existing approaches often include developers embarking on localization only in the quality assurance (QA) stage, and even then the scope regarding custom logic and third party integrations often remains unclear to developers. It is a common situation for linguistic quality to be unreliable, terminology to be inconsistent and stylistic choices to appear random, so that a web site or application feels "translated" instead of "native".

Developers need a better approach for effectively supporting accurate translation of GUI elements in a web application—meeting internationalization and localization requirements during the design phase for applications and platforms, and also meeting the need for ongoing updates that appear native to their global users. Modern data centers are complex and their infrastructure needs to be able to incorporate ongoing updates. A global data center (DC) can include super-pods (SP) and points of deployment (PODs). Each POD can serve tens of thousands of customers with multi-tenant services. Each end user is connected to a point of deployment (POD) which includes different roles, including web server, database server, logging metrics server and additional servers to index data and transform customer data. Each app delivers a service that can include multiple functional roles. In an example, a certified role refers to one service such as marketing, customer relationship management or user interface (UI).

The disclosed systems and methods provide tools for accurate and effective translation of elements in a web application via localization for applications, including those delivered via large web sites, by adapting internationalized software for a specific region or language—adding locale-specific components and translating text. These tools make it possible to deliver translated web applications of higher linguistic quality, seamless native experiences for global users of the web applications, effective use of development resources, efficient translation to a production quality web platform or application, multiple target languages released simultaneously, and easy ongoing updates for site maintenance. The disclosed technology scales nicely, so that four, fourteen or forty languages can be released in parallel.

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The disclosed technology includes a tag sanitization cleanup and exception generation tool set configurable to present tags in a preliminary localization kit to a human localization expert; run a tag name convention enforcement tool against the preliminary localization kit, which parses extracted tags and locates key name strings and translatable text (default and optionally original), then applies key naming rules that require presence of at least one keyword from a list of valid keywords and that require key uniqueness: either matching values or different keys. Additionally the disclosed tool set creates bug report stubs for completion by the human localization expert, including in the bug report stub context from a tag exception generated by applying the key naming rules to a parsed key name string and accepts additional comments from the human localization expert to include in a completed bug report, regarding the key name that triggered the exception. The tool kit can also generate sanitization correction files using the received key names and edited translatable text for processing by a developer.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 4B shows the report generated by running the key name verification tool on the property files in a selected folder.

FIG. 6A shows the report generated by running the post-merge sanitization check tool shown in FIG. 5.

FIG. 6B, FIG. 6C, and FIG. 6D show examples of errors identified via the tools, and reports that show the results after the errors have been fixed.

FIG. 7B shows the report of results for the post-merge sanitization check tool shown in FIG. 7A.

FIG. 12D shows an example report resulting from the LVT, which compares the original language pack before linguistic in-context testing, to the final language pack.

FIG. 13 shows one implementation of debug mode, for a translation into Japanese.

DETAILED DESCRIPTION

Figure 1:
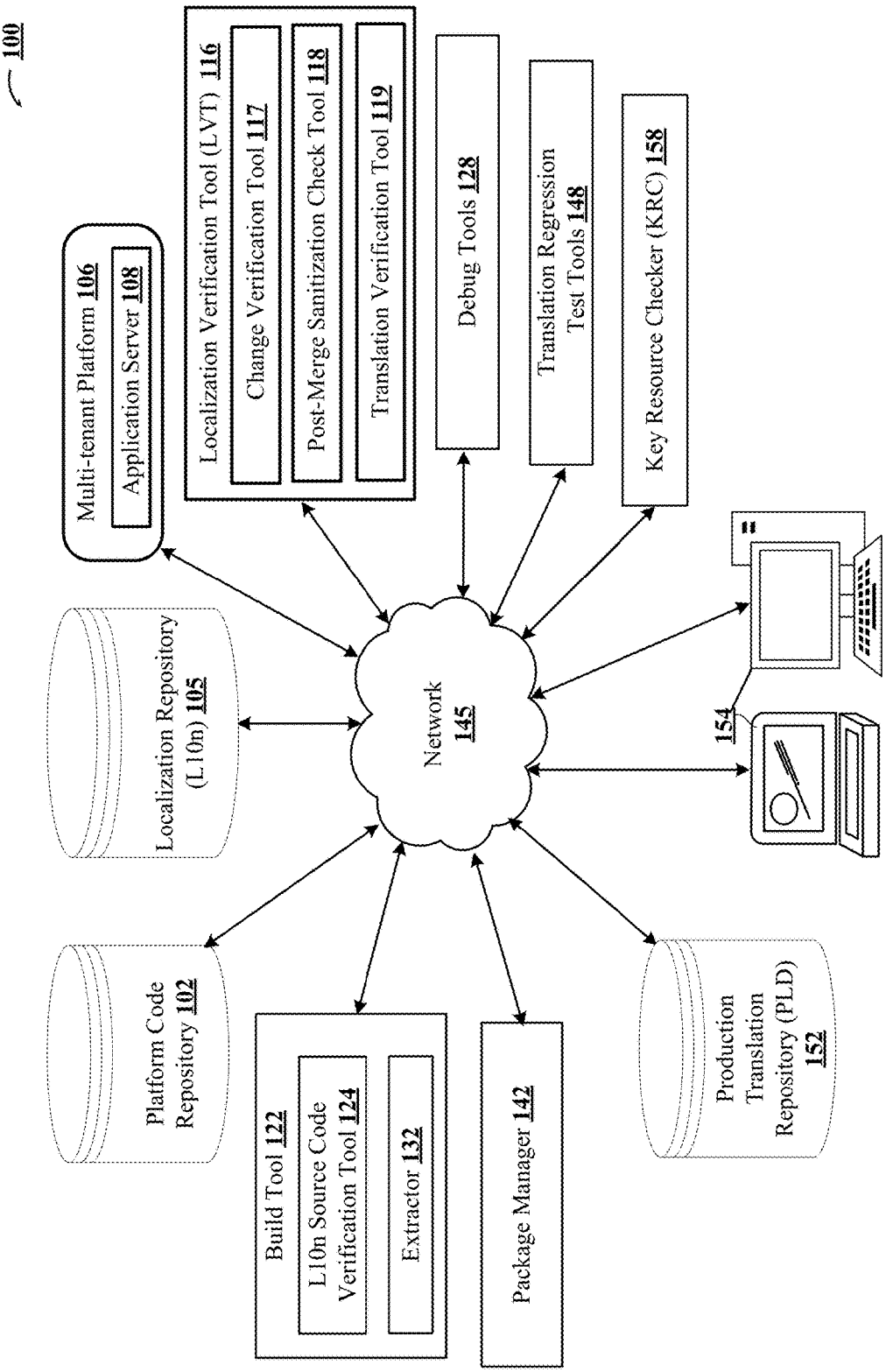
FIG. 1 illustrates an environment for accurate translation of elements in a web application.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Globally, web applications and platforms communicate information to millions of users internationally—with as many as a thousand pages for advanced web applications. Developers of the applications and platforms need to consider various web page formats and forms used to present information to and gather information from users, including address forms, date formats, currency formats, payment methods, shipping methods, taxation, gift registry events, and search key words. To address the need for translation of a website to multiple languages, translatable text needs to be localized. Incomplete translations of a website can result in foreign characters getting garbled, text being truncated or running over the allocated space on the page, numbers showing in English format, and seemingly mismatched strings of characters that are difficult to map to the user interface (UI). Additionally, concatenation of strings and recycling of strings can cause grammatical problems in translations. Hundreds of developers create text, and not all are native speakers or follow a language style guide for the application UI. Developers in the design phase need to consider localization (L10n) requirements that define functional adaptations that enable designing a software application that can be adapted to various languages and regions without ongoing engineering changes. An internationally used web application is only as good as its translations, which are often not tested in context. For example, a web application that utilizes 125 functional modules can include a thousand web pages to deliver its content, with as many words to be translated as an average HARRY POTTER novel: approximately 180,000 words, requiring approximately 8000 property keys to uniquely identify each text string.

Sometimes linguists have no QA test scripts to follow, resulting in unsystematic defect tracking. Translation memories need to be archived and propagated to later versions of translations, to avoid recurring issues that have previously been addressed. Application and platform developers need to test translations early, often and in context; and they need to test every localization update, test several languages simultaneously, and track linguistic issues separately from functional defects.

After its initial localization an international web application is only as good as its next update, so website and application developers need a maintenance strategy for L10n. The disclosed systems and methods include tools for automating the L10n process, with developers evaluating every new feature for L10n implications—and naming new keys, files and folders consistently, and creating localization kits with folders of translatables organized into full (i.e. all), new (i.e. never before translated) and changed (i.e. translated before but source text changed) sets of files. The disclosed methods also include a plan for linguistic testing and bug fixing after staging the built language packs, before ultimate deployment to production instances. An environment for accurately and efficiently translating large web applications into multiple languages, via internationalization and localization, is described next.

Environment

FIG. 1 illustrates one environment 100 for localization for large web applications—adapting internationalized software for a specific region or language by adding locale-specific components and translating text. Environment 100 includes multi-tenant platform 106 with application server 108 with production applications, which can include one or more of customer relationship management (CRM), sales, service, marketing, data analytics, ecommerce and customized applications. Environment 100 also includes platform code repository 102 with source code for delivering an application or web site. Source code languages include but are not limited to JAVASCRIPT, JAVA, GOOGLE Web Toolkit (GWT), ISML, or other general-purpose computer programming language. In one implementation, source code management is implemented using Git. In another case, PERFORCE, SUBVERSION or other version control software can be utilized as a repository. Localization repository 105, in environment 100, includes several versions of localization translations for multiple languages, for in-process translations for new languages, and updates for new code versions. Localization kits include a folder that holds a full set of translation keys and strings, a 'new' folder that holds newly added keys and strings, and a 'changed' folder that holds keys and strings changed after a previous version of the source code release and associated language pack, described in detail infra. Environment 100 also includes production translation repository 152 which holds production-ready translation packs for multiple languages being delivered globally. In one example implementation, Japanese, French, Chinese and Italian language packs reside in a production translation repository, from which language packs may be retrieved and installed in a web application on a local desktop or cloud-based computer. A *Nexus* repository can be utilized in one use case. In other use cases, Git or other repositories can be utilized.

Continuing, environment 100 also includes build tool 122 for determining whether extraction rules are executed accurately, and for verifying tag syntax, bundle names, key names, duplications, and some quoting rules. Build tool 122 uses an L1 On source code verification tool 124 to examine the templates to determine if there are errors, and flags suspicious and non-portable constructs, and keys and strings that do not adhere to rules for the translation system. Every key uses a reserved keyword as a context qualifier and an additional element that makes it unique on the page. Example rules include using each distinct key exactly once—that is, keys are unique; no empty strings are allowed, and a bundle has exactly two parts: the folder name and the file name. In one implementation, all text in one file is in a single bundle and the bundle goes to a single translator. Also included in build tools 122 is extractor 132 for extracting tagged text, including comments, from the set of code files. Additionally, key resource checker (KRC) 158, in environment 100 is a tag sanitization cleanup tool that checks whether key naming conventions that are meaningful to the translators as contextual information are being adhered to by developers—screening for approximately twenty types of user interface (UI) elements, as described in detail infra.

Also included in environment 100 is package manager 142 that can automate the process of installing, upgrading, configuring, and removing computer programs for the computer's operating system. Package manager 142 deals with packages that contain metadata, such as the software's name, description of its purpose, version number, vendor, checksum, and a list of dependencies necessary for the software to run properly. Package manager 142 can distribute software and data in archive files, and maintain a database of software dependencies and version information to prevent mismatches and missing prerequisites, and can eliminate the need for manual installs and updates.

Environment 100 further includes a localization verification tool (LVT) 116 for comparing initial extraction and post-sanitization versions of extracted tags, which includes post-merge sanitization check tool 118 configurable to compare kit versions using the preliminary localization kit and a sanitized localization kit, and translation verification tool 119, described in detail infra. In one implementation, LVT is written using the JAVA programming language. Other programming languages can be used in other implementations. Environment 100 also includes debug tools 128 for an individual translator debugging pass, during initial translation, and usable during source version versus translated version walk-throughs. In one example use by QA, debug tools 128 flag any text still in English after translation, and flag text that has been extracted but not translated. Additionally, localization regression test tools 148 in environment 100 re-combine translated elements with the web application and exercise the web pages that contain translated elements, with automated scanning of renderings of those web pages.

User computing device 154, also included in environment 100, provides an interface for administering access to developers and process owners to use for managing the translation process, via both browser UIs and mobile applications. In some implementations, user computing devices 154 can be a personal computer, laptop computer, tablet computer, smartphone, personal digital assistant (PDA), digital image capture devices, and the like.

In some implementations, the modules of environment 100 can be of varying types including workstations, servers, computing clusters, blade servers, server farms, or any other data processing systems or computing devices. Modules can be communicably coupled to the data store via a different network connection. For example, multi-tenant platform 106 can be coupled via the network 145 (e.g., the Internet) with production translation repository 152 coupled to a direct network link, and can additionally be coupled via a direct link to platform code repository 102. In some implementations, user computing device 154 may be connected via a WiFi hotspot.

In some implementations, network(s) 145 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZIGBEE, or other appropriate configuration of data networks, including the Internet.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

In other implementations, environment 100 may not have the same elements as those listed above and/or may have other/different elements instead of, or in addition to, those listed above.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Figure 2:
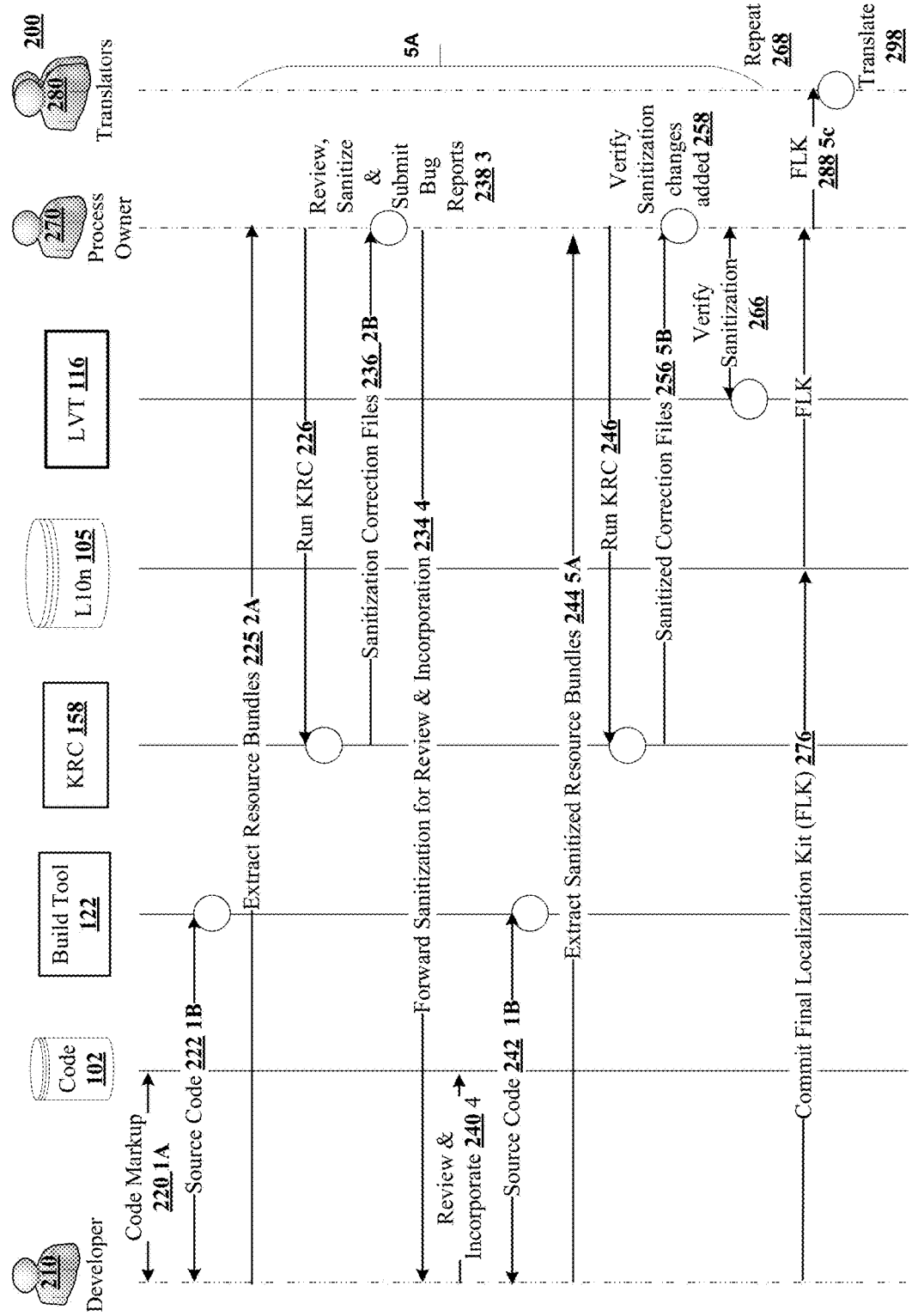
FIG. 2 shows an example message flow for preparing a web application framework for translation to multiple languages, and for creating a localization kit that is transferable to a human translator.

FIG. 2 shows an example workflow 200 for preparing a web application framework for internationalization and translation into multiple languages, and for creating a localization kit that is transferable to a human translator 280 for translation into the desired target language. The finalized localization kit can be transmitted to multiple translators for translation into as many target languages as needed during the same time interval.

Developer 210 plans for localization by designing a software application that can be adapted to various languages and regions without ongoing engineering changes—separating code and text, preparing the code, and enabling the preparation of the text. Resource bundles are stored as collections of key-value pairs, with a unique property key for each unique string. Rules for internationalization include the following: marking localizable/translatable text for extraction from the code, moving text to UI templates, using full sentences for translatable text, and avoiding concatenation of text to form a sentence, as shown next. Word order may change with language, and parameters in strings used for dynamically generated references to numbers or strings, as the code is executed, may also influence the grammar of the string at hand.

"Dear "+cust.getSalutation( )" "+cust.getLastName( )", welcome back"

Continuing with rules for internationalization, developers need to create one string for singular and one for plural use; provide a key that explains what the text is about, and how it is used; avoid HTML markup in the text; and ensure that data for the user is in the correct locale—for example, table headers are in the UI locale, even if the table header is the attribute name of a business object. Table content belongs in the data locale except when it is part of the UI, such as a 'delete' link.

Special care needs to be taken with any characters which might have a special meaning in the programming languages and technologies in use. In some cases this includes double quotes and apostrophes (used for delimiting string literals), in other cases colons. Such characters need to be handled by the proper escape sequences for the respective programming language. For example, apostrophes are treated differently from language to language and can land in the text after translation and introduce code functionality changes. Colons can also break code.

During the markup process, developer 210 includes in their code base special markup, and references to code classes, to mark the translatable text. These tags and references to code classes mark text which needs to be shown in a localized version of the UI. They are used for two purposes: for looking up, at runtime, the localized version of the text (as defined by the bundle and key); and for automated extraction of all the to-be-translated text from the affected files. In some cases these are special HTML tags, such as the markup shown next.

<ISTEXT bundle="customer.customergroup" key="field.type.select" default="Select type"/>

In other cases these can be special JSP tags. In one implementation, developer 210 includes in their code base, two code classes—LocaleHelper as public API and LocalizationHelper for implementation and can include an ISMSG module for use in the markup process, and in pulling in the translations.

<ISINCLUDE template="inc/Modules">

ISMSG tags mark text which needs to be shown in a localized version of the UI. Inside of these tags are parameters for bundle and key name, and for the default version of the text, for cases when the look-up cannot find any localized version. Optionally, the text might specify some parameters, which are then also part of the tag. A simple use case example is listed next.

<ISMSG bundle="customer.customergroup" key="field.type.select" default="Select Type"/>

This message can be found in the file customer/CustomerGroup.isml, as can be seen from the bundle name, and is part of a form—the drop-down for selecting the customer group type. Listed next is a more complex use case example, which shows a parametrized breadcrumb, containing the ID of the user group.

<ISMSG bundle="customer.customergroup" key="breadcrumb.rest" default="{0}-General" param0="#CustomerGroup:ID#"/>

Continuing with FIG. 2, developer 210 completes code markup 220, wrapping text to be localized in an ISMSG tag; using parameters as shown next; and importing any needed parameter URLs using a custom user-defined JSP tag. When a JSP page containing a custom tag is translated into a servlet, the tag is converted to operations on an object called a tag handler. The Web container then invokes those operations when the JSP page's servlet is executed.

---

```
<ISMSG bundle="D.F" key="K" default="some text">
<ISMSG bundle="D.F" key="K" default="Product {0}"
param0="#Product:SKU#">
<%@ taglib prefix="l10n" uri="L10NTags" %>
<l10n:msg bundle="D.F" key="impex.text">Here you
<l10n:param name="link">
<a href="#URL(Action('Pipeline-Start'))#" class="selection_link">
</l10n:param>manage imports</a>for images.</l10n:msg>
```

---

Markup of static JavaScript (JS), including JS that uses the ExtJS library, utilizes two steps. Since JS is executed by the browser at runtime and not by the application as such, the localized text needs to be transferred to the browser at runtime. The calling UI page needs to pull in the localization data, as shown next. (In some cases this is in ISML.) The localization is indirect in this case. The template provides data which the JS then uses. In some cases the markup of the to-be-translated text can look like the following example.

field: l10n("js.file", "key", "text"),

The reference to the localization data can look like the following example, and make use of a special HTML tag in the enclosing UI page.

<isinclude url="#URL(Action('ViewApplication-Get-ResourceBundle'), Parameter('BundleName'.'js'),Parameter('l10ndebug',l10ndebug))#">

Developer 210 handles JAVA, using the LocaleHelper public API code class, takes special care with the bundle name, and provides parameters with a map, as listed next.

LocaleHelper.translateString("java bc catalog.Class", "key", "text")

In some cases, developer 210 can create a shortcut that handles tooltips in UI templates, via the ISMSG tag, providing the key for the tooltip. In some implementations, tooltips for attributes can come from the object definition. Sometimes developer 210 needs to add a note for the translator—for example, explaining what a parameter means. These comments get extracted and put into a readme.txt for the translators.

```
<ISMSG msg="user {0} " param0="#Name#" comment="0: first name">
l10n("d.f", "k", "user {0} ", name); // 0: first name
LocaleHelper.translateString(...); // 0: first name
0: first name
```

In one example use case, for a pre-existing application delivered via extensive web application that includes 1000 web pages, six developers may be required to work for two months each to markup text with approximately 180,000 keys; and with five QA testers working for five weeks to check to find resulting code breakages.

Continuing with FIG. 2, developer 210 stores marked-up code in platform code repository 102, and sends source code 222 to build tool 122 which uses the L10n source code verification tool 124 to verify that the mark-up is correct, so that the extraction process can run successfully. L10n source code verification tool 124 accesses extractor 132 to extract resource bundles 225, which include extracted tags used to locate key name strings and marked-up translatables. In one example, extractor 132 can also verify, when performing the mark-up, that the translatables are extracted as intended—checking parameter handling during development of the application. In some implementations, a scan tool can be utilized to find text that was not extracted, thus identifying places which have not yet been marked up by developers, and so would remain in English when the respective localization kit is translated. Extraction is typically run after all code features for a release are completed.

Process owner 270 receives the extracted resource bundles as a preliminary localization kit with a directory structure that includes a "full" folder containing all properties files in their current state; a "new" folder with not-yet-translated strings; and a "changed" folder with files containing strings in which the source language has been updated since the previous final localization kit. In one implementation, the extracted preliminary localization kit label includes the date of extraction. The "full" folder includes all keys in all languages, and localization kits are independent of the code release as they only include language-related content. A developer can extract, for a specific code version, a localization kit that contains to-be-translated text for exactly this code version and complete the translation process to deliver a language pack, as long as the process owner has access to the previous localization kit. Resulting language packs can be used with multiple code versions.

As part of the initial mark-up of translatables, the key used for uniquely identifying a string needs to help the translator understand its linguistic context in the UI: knowing the type of UI element in which a string will be displayed allows the translators to choose the correct terminology, grammar variant (e.g. the infinitive, a full sentence, an imperative etc.) and punctuation. For example, translations of source text that is a "heading", "message" or "button" may differ in usage of upper and lower case and of active or passive style, and infinitive or imperative of a verb. In the 'button.new' key example, the bundle gives the context that it is, for example, a label on a button used for creating a new customer.

Key names show context in translator tools, and help human translators to minimize terminological and stylistic errors, so accurate names are required. The first element might signal where in the page the key appears, such as for table/table.header, followed by the key type, and then the identification. Different elements of the key are separated by dots. If one element consists of multiple words, developer 210 separates them by underscores, as for error.no_file, or uses CamelCase, as for error.NoFile—writing compound words or phrases such that each word or abbreviation in the middle of the phrase begins with a capital letter, with no intervening spaces or punctuation. Developers use a list of property key types with allowed keywords that match specific UI elements, including tabs, buttons, fields, breadcrumbs, errors and links. When a natural language string needs to be split into multiple parts, developers use the same key for all parts, and add a sequence number to the end of the key, so that when the resource bundles (also referred to as resource files) are sorted, the keys stay in order.

Figure 4A:
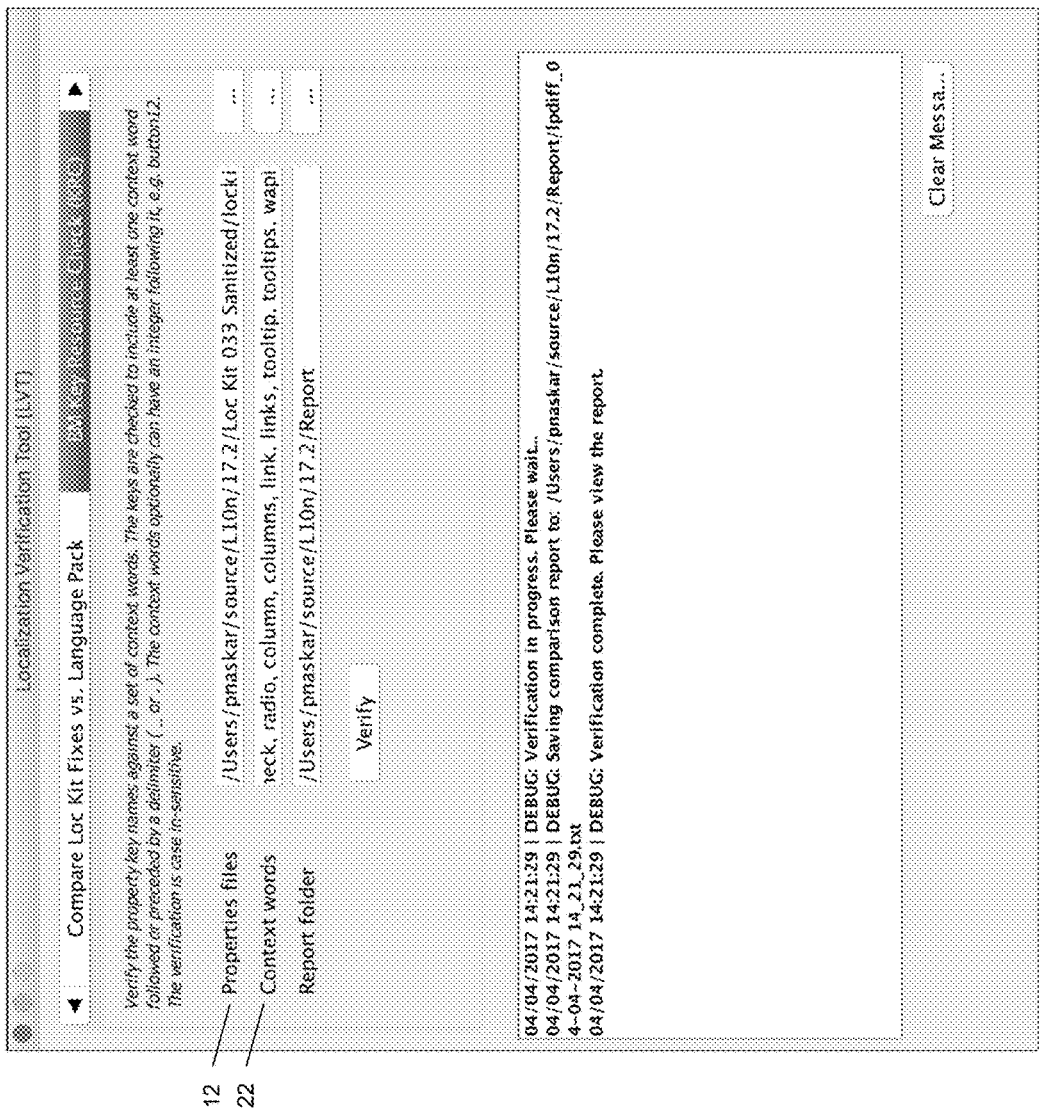
FIG. 4A shows an example UI for a key name verification tool for verifying the property key names against a set of context words that they must contain.

Process owner 270 sends the extracted bundles received from developer 210 to key resource checker (KRC) 158 via run KRC 226, to screen for the approximately twenty types of user interface (UI) elements and check whether key naming conventions—that is, the presence of defined keywords identifying the UI element correctly—are being adhered to by code developers, as shown in FIG. 4A and FIG. 4B and described infra. In one implementation, the extracted bundles are zipped before being sent. Input to KRC 158 includes the set of extracted properties files, including changed properties showing keys whose values have changed (i.e. the text strings in the source language) changed in the current release, and new properties for keys (i.e. newly added text in the source language) added in the current release.

KRC 158 includes a tag sanitization cleanup and exception generation tool set configurable to present keys in a preliminary localization kit to a human localization expert; run a tag name convention enforcement tool against the preliminary localization kit, which parses extracted keys and locates key name strings and translatable text (default and optionally original), then applies key naming rules that require presence of at least one approved keyword identifying the respective UI element where the text appears from a list of valid keywords and that require key uniqueness: either matching values or different keys. The tool is also configurable to create bug report stubs for completion by the human localization expert, including in the bug report stub context from a tag exception generated by applying the key naming rules to a parsed key name string and accepts additional comments from the human localization expert to include in a completed bug report, regarding the key name that triggered the exception. The tool can accept edits to the translatable text from the human localization expert; and generate sanitization correction files using the received key names and edited translatable text for processing by a developer. KRC 158 returns sanitization correction files 236 to process owner 270 who reviews the correction files and submits sanitization requests and submits bug reports 238. Process owner 270 forwards the sanitization for review and incorporation 234. Sanitization—that is, normalization of all new and changed strings—involves changing terminology, punctuation, spelling and style for adherence to the style guide and glossary as well as resolving potential localization problems, such as concatenations or order of parameters. Sanitization includes applying any needed escape sequences, such as for single or double quotes. In one implementation, program escape sequence rules can be included in the sanitization, as suggestions or automatic corrections.

Developer 210 reviews and incorporates 240 the sanitization results into platform code repository 102, merging the sanitized strings back into the master code to prepare the improved English source UI for release. Developer 210 sends the sanitized source code 242 to build tool 122 which uses lint to verify that the sanitized mark-up is correct. In some use cases, a QA review of the sanitizations may be performed if the scope of new content warrants it.

Figure 5:
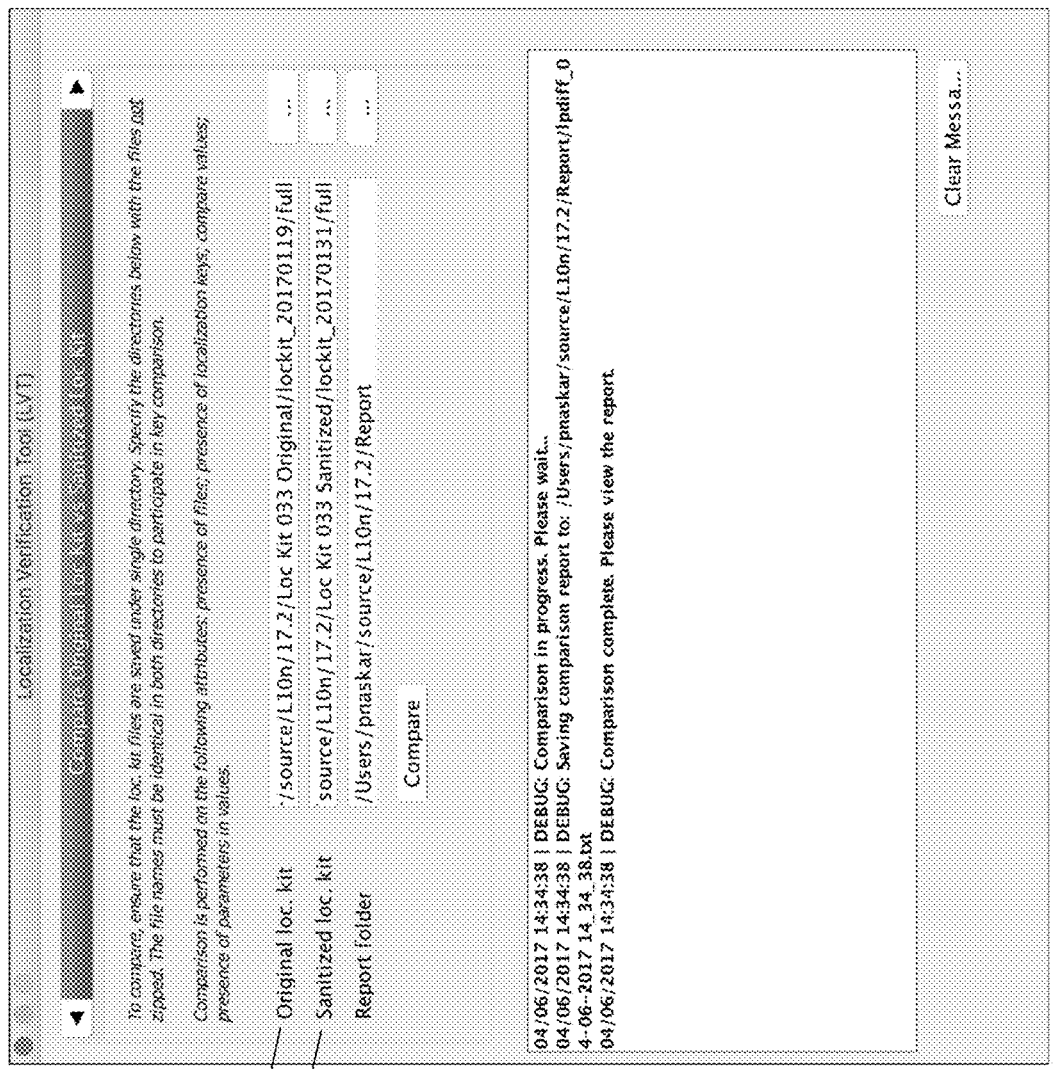
FIG. 5 shows an example post-merge sanitization check tool configurable to compare a sanitized localization kit into which the sanitization correction files have been merged, to the original or preliminary localization kit.

Continuing with process of preparing a localization kit for translation by human translators depicted in FIG. 2, developer 210 extracts sanitized resource bundles 244 and process owner 270 sends the extracted sanitized bundles received from developer 210 to key resource checker (KRC) 158 via run KRC 246. In one implementation, the extracted sanitized bundles are zipped before being sent. KRC 158 returns a report of the corrections in the sanitized correction files 256 to process owner 270, who verifies sanitization changes have been incorporated 258. The process iterates: verifying sanitization 266, forwarding sanitization for review and incorporation 234, developer 210 review and incorporate 240. Keys that stayed the same are suppressed, and the developer merges these sanitizations. In some cases, a human QA expert must approve the request for the corrections to be merged into the release branch. Then the new and improved English is live in the production environment and the localization kit that gets pulled is a clean source for the translation. Process owner 270 receives a revised version of the localization kit and runs the KRC 246, leading to committing a final localization kit 276. Process owner 270 verifies sanitization using localization verification tool (LVT) 116 which includes post-merge sanitization check tool 118, configurable to compare kit versions using the preliminary localization kit and a sanitized localization kit, into which the sanitization correction files have been merged, as shown in FIG. 5, described infra. The LVT runs a change confirmation tool 117 that compares a selected preliminary localization kit with the sanitized localization kit that counts, compares and reports total numbers of files in the preliminary localization kit and the sanitized localization kit; compares and reports differences in key content between corresponding files in the preliminary localization kit and the sanitized localization kit; and compares and reports differences in parameters-in-values between corresponding files in the preliminary localization kit and the sanitized localization kit.

When the delta between the preliminary localization kit and the final localization kit matches the sanitizations that were handed back the localization kit is deemed ready to be translated. If some expected changes are not reported, the QA person investigates if there were merge conflicts that the developers ignored. Steps can be repeated 268 to resolve any errors. In one implementation, post-merge sanitization check tool 118 counts number of files in the full folder of the selected preliminary localization kit, counts number of files in the full folder the sanitized full localization kit, and compares the count of number of files in the full folder of the selected preliminary localization kit to the count of number of files in the full folder of the sanitized localization kit. The check tool also compares key content of each file in each folder (full, changed and new) in the selected preliminary localization kit to key content of a file with the same file name in a folder with the same folder name (full, changed and new) in the sanitized localization kit. The check tool additionally compares parameters-in-values across the files in the selected preliminary localization kit to parameters-in-values across the files in the sanitized localization kit; and generates a post-merge sanitization correction report that displays the results of comparing the count and content of files in the preliminary localization kit's full folder to the count and content of files in the sanitized localization kit's full folder; lists differences in keys by file name for each pair of same-name files compared in the full, changed and new folders in the preliminary localization kit and the full, changed and new folders in the sanitized localization kit; and lists differences in parameters-in-values, by folder name, in the full, changed and new folders in the preliminary localization kit and the full, changed and new folders in the sanitized localization kit.

Further continuing with FIG. 2, in some implementations, the process owner 270 iterates, with changes prompted by analysis or and response to results of running localization verification tool (LVT) 116. After the sanitized localization kit 266 has been verified, developer 210 commits the final localization kit (FLK) 276 to localization repository 105, and process owner 270 sends the final localization kit (FLK) 288 to human translators 280 to translate 298. In one implementation, translators receive a single zipped file with folders of key-value pairs to be translated. In other implementations, the localization kit can be packaged differently. The finalized localization kit gets run through a computer-aided translation tool (CAT) such as memoQ. In one implementation the CAT tool's translation memory tool is utilized to determine new, fuzzy-match and non-translatables for the target languages. In some use cases, a machine translation tool can be connected to the CAT so that a machine-translated (MT) draft could be prepared that is edited by human translators.

In another implementation, a different tool may be used to support human translators to complete the translations to multiple different languages. In one implementation, the localization kit can be translated from English to French, Japanese, German, Italian and Chinese. In another case, the kit can be translated to many other languages, using the disclosed methods and systems. In one example, a group of four translators, one for each of four languages, each work for a week to complete the translation into four languages, for a finalized localization kit.

Figure 3:
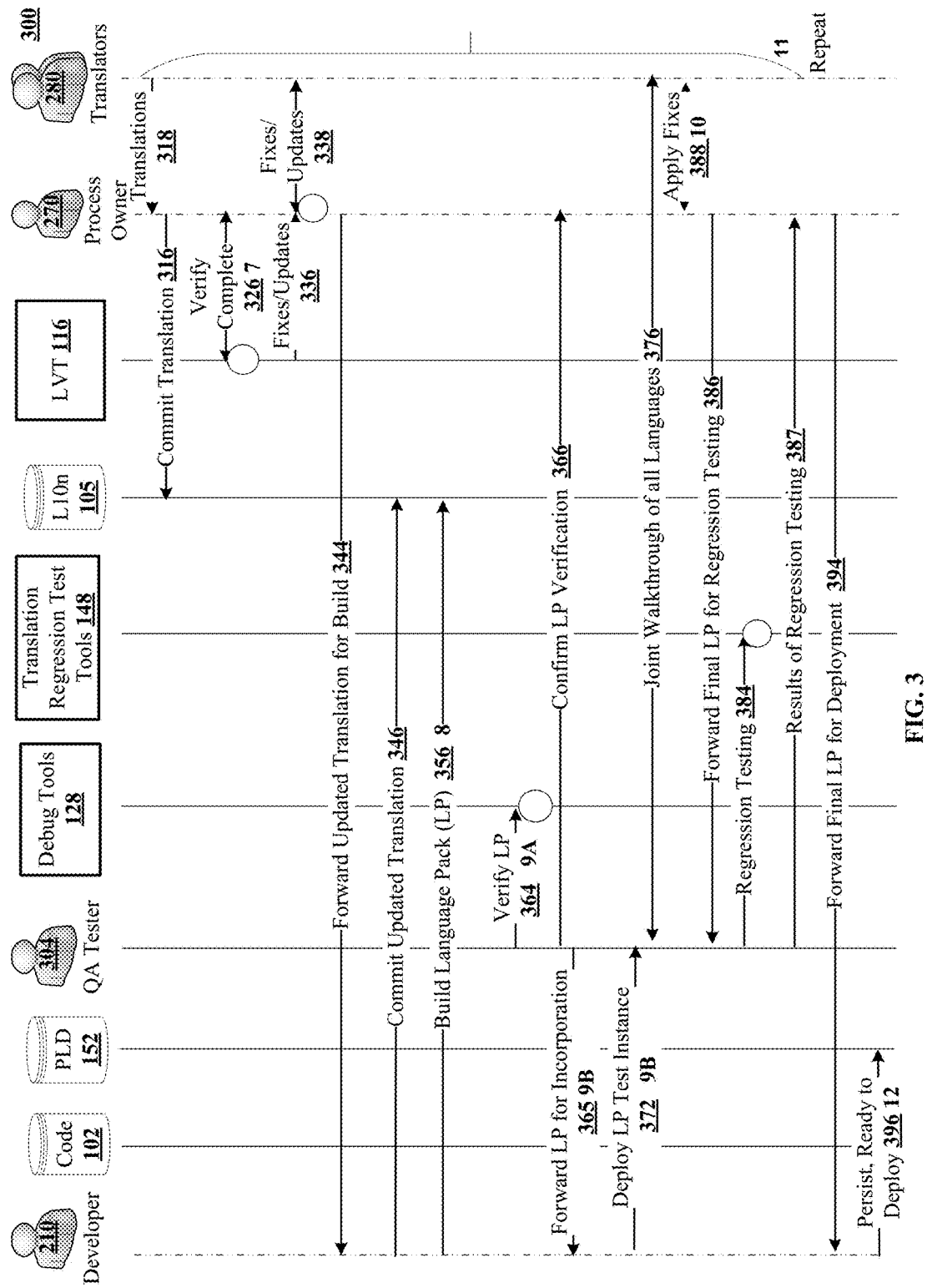
FIG. 3 shows an example message flow for receiving translations of a finalized localization kit from translators, completing quality assurance testing and verification, and deploying to production a language pack that includes multiple target language translations.

FIG. 3 shows an example workflow 300 for receiving translations 318 from translators 280, of a final localization kit, and completing quality assurance testing and verification that all files are included, and that all of the text has been converted to the designated language. Workflow 300 also includes production of a fully QA tested language pack that implements a full set of languages.

A human translator or translation project manager using translation tools and edits can introduce errors. For example, keys can be lost or corrupted, parameters can be lost or corrupted, encoding of files may be wrong, or escaping rules for certain characters may not have been adhered to.

Continuing with FIG. 3, process owner 270 commits translation 316 to localization repository 105 and sends the translated localization kit to localization verification tool (LVT) 116 to verify the translated kit is complete 326. LVT 116 validates, by automated tests in translation verification tool 119 which ensure that number of files is correct, that the number of keys in each properties file is correct, and that parameters are not broken, as described for FIG. 7 infra. Process owner 270 communicates fixes and updates 338 to translators 280 and tests further fixes and updates 336 of the file structure and content using localization verification tool (LVT) 116. Process owner 270 forwards the updated translation for build 344 to developer 210 who commits the fixed, updated translation 346 to localization repository 105 and builds language pack 356. QA tester 304 verifies the language pack 364 using debug tools 128, described in detail infra.

Figure 12A:
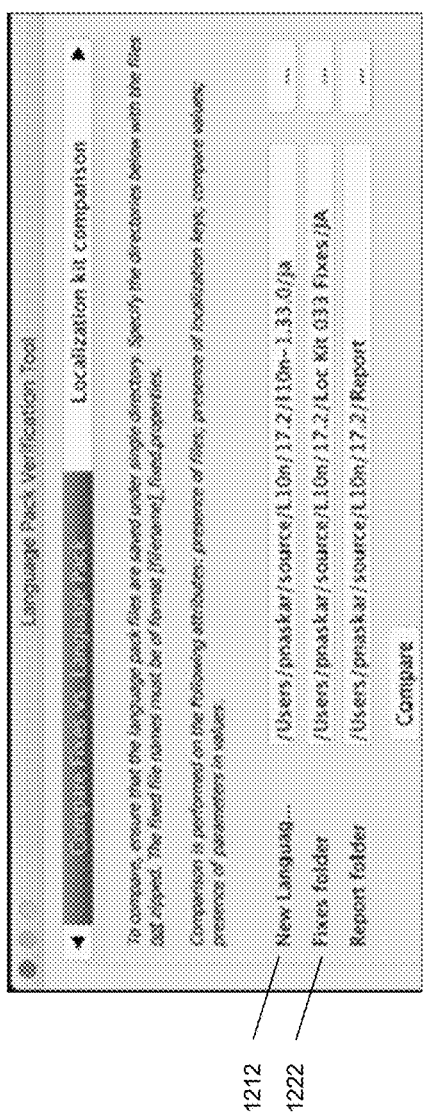
FIG. 12A displays a comparison tool UI for testing fixes of a localization kit delivered by the translators.
Figure 12B:
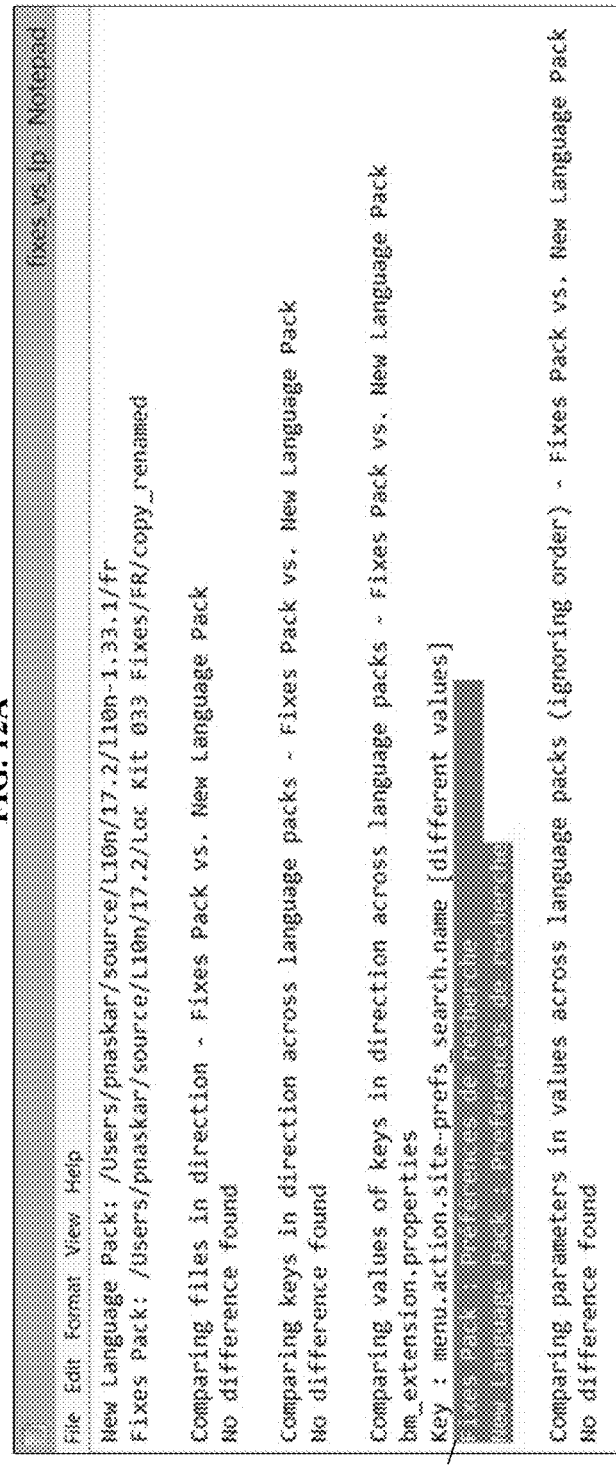
FIG. 12B shows an example report for the comparison of a translation into French, of a fixed localization kit.

Further continuing with the process described by FIG. 3, after validation by automated tools that the language pack matches the delivered translations, QA tester 304 confirms language pack (LP) verification 366 to process owner 270 and forwards the LP for incorporation 365 by developer 210 for testing in context in a test instance of the web application—by the translators, via a joint walkthrough of all translated languages 376 with translators 280 of the respective kits. Developer 210 deploys a language pack test instance 372 for QA tester 304, often a language expert, who prepares a test script based on new and changed strings. The test script leads translators to exact pages so everyone sees the UI in the source language and each translator views the version they translated. In one implementation, after discussion with QA tester 304, translators fix identified errors, and the translation company sends back an updated set of files. For some web application code, the engineering team must rebuild the entire code base even for language changes. In other implementations only the language pack gets rebuilt. A report that compares fixes to the current language pack is shown in FIG. 12A and FIG. 12B and described infra.

After testing of changed and new features, in context, for each language, and after coordinating with translators 280 to apply fixes 388 to the translated files, process owner 270 receives the fixed translations from translators 280 and forwards a final language pack 386 to QA tester 304 for regression testing 384. In one use case, an automated test confirms that every web panel in the web application displays in the foreign language. In one implementation, QA tester 304 performs regression testing 384—in some implementations, covering ten to fifteen percent of the translated web application. Translation regression test tools 148 iterate over changes to the web app panels, for the selected language, and generate web application context renderings for human visual inspection to verify that translated characters in translated text strings do not break the web app panels. In some cases, regression test tools 148 iterate over changes to the web app panels, for the selected language, and generate web-app-context renderings for machine inspection to verify that translated characters in translated text strings do not break the web app panels.

One tool runs automated tests to verify that all pages in the application web site can be reached by clicking on a menu. This verifies that the pages in the app are not rendered empty, but display in the chosen language. The automated in-context tests call a single core module which contains all test cases for all supported languages. The automated in-context verification tool uses specified language packs for each supported language for parameters. In one use case, the test logic gets run through a custom XLT module, by Xceptance, which looks at the specified language pack and its key value pairs, and navigates to the panel under test to find the UI element to verify. The test asserts that the obtained value, specified in language packs, matches the text in the UI element rendered on web page. The automated in-context test will fail if even one mismatch is found. Any exception or message gets written into a live log file. The automated in-context verification tests can be run locally on the tester's machine during the language pack qualification process or continuously during the development cycle in an integration environment. Language packs for each supported language can be specified in local jobs, which can be set to run at any time.

Figure 12C:
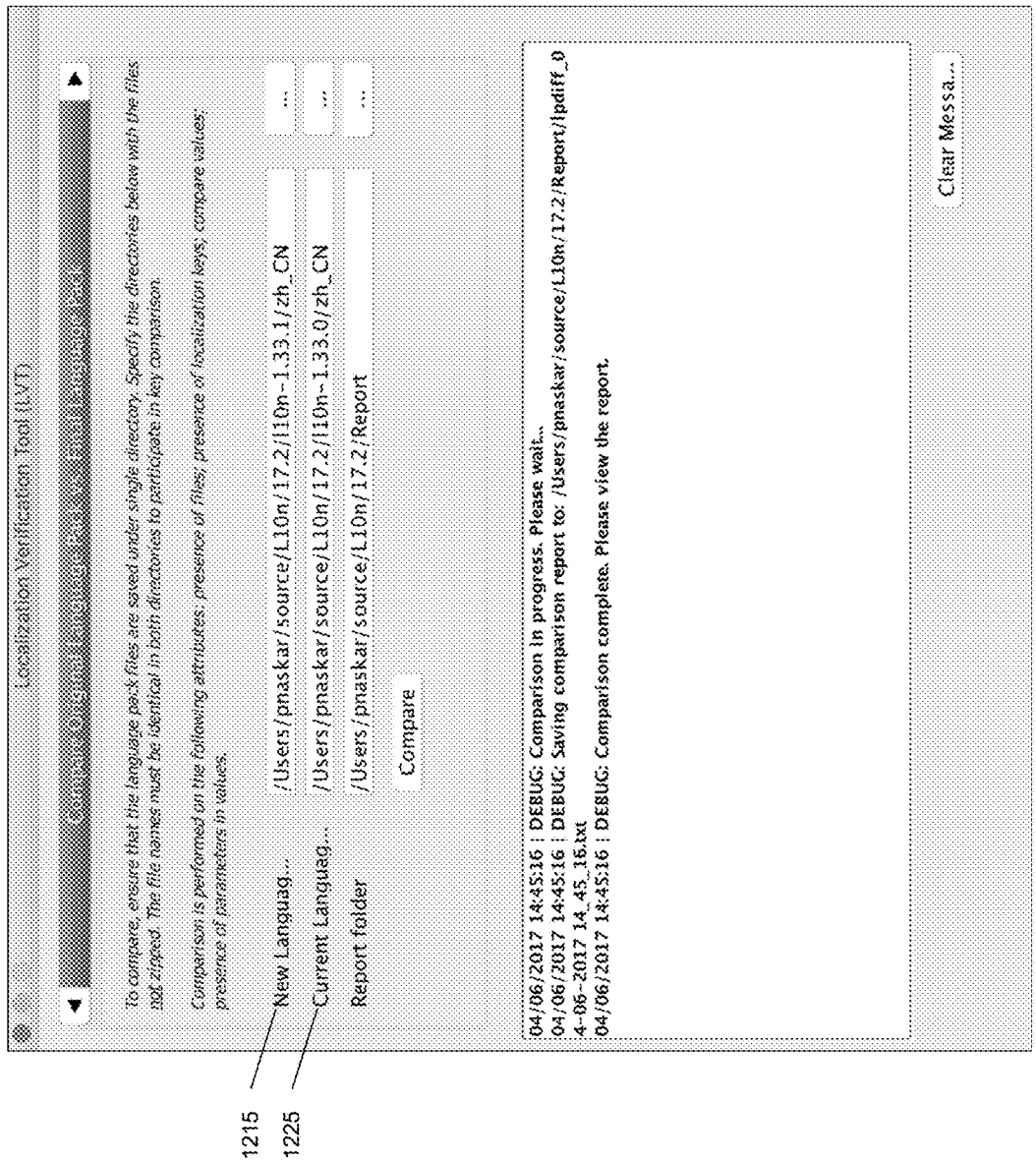
FIG. 12C shows a report UI for comparing a newly-built language pack to the original language pack.
Figure 12D:
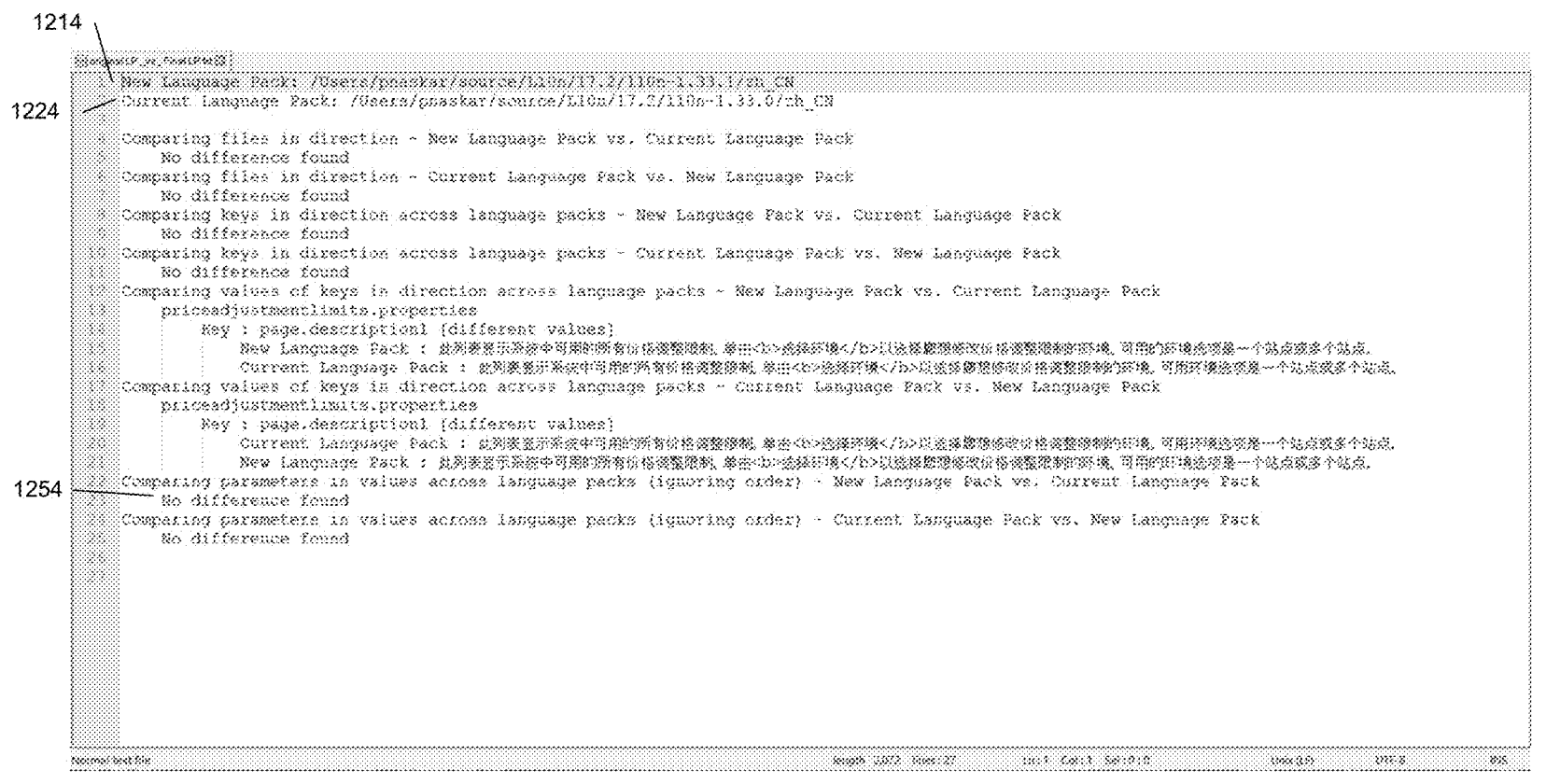

Continuing with the process shown in FIG. 3, results of regression testing 387 are forwarded to process owner 270, who applies fixes, validates the translated LP, and forwards the final language pack for deployment 394 to developer 210 who persists the finalized language pack 396 in production translation repository (PLD) 152, an object code repository usable for deploying language packs. Validation of the translated LP can include running a report that compares the new language pack to the original language pack, as shown in FIG. 12C and FIG. 12D and described infra. In one implementation, an automated system adds version information before adding the files to PLD 152, from which they can be deployed. Process owner 270 notifies the operations team that the language pack is ready for deployment to production machines. In one implementation, when automated verification of the resource files that compose the LP is complete, they are once more deployed to a dedicated test instance for this release but also to a test instance from the most recent global release XX.x-1 to check backward compatibility, because the globally applied language pack—when deployed to preview instances of global release XX.x of the platform, will be utilized also on the XX.x-1 production instances on the same POD. For some implementations, QA tester 304 completes additional spot-checking for regressions. Deployed language packs are also committed to the source control system for the application code, in many implementations. In one example implementation for translations of a web application to four languages, one language pack includes all four languages as four zipped files, which get deployed to the test instance, and after testing is complete get committed to the source code repository.

FIG. 4A shows an example key resource checker (KRC) 158—a key name verification tool for verifying the property key names against a set of words identifying UI elements 422, which are allowed key words entered as comma separated text. In this example, the tool tests the properties files in the "changed" folder 412. FIG. 4B shows the report generated by running the report shown in FIG. 4A on the property files in the changed folder. In the report example, key:customerCdnshelp.2.1.2 476 is listed a2 not being a permitted key type. The QA tester 304 can use this information to complete a bug report to ask the developer to rename these keys, because localization experts and translators need to know by the key name, whether a key points to a column, a radio button, a title, an error message a button, or other element, so they can choose the right grammatical style and terminology when translating, as well as locate the respective UI element on the page when testing in context. The bug report stub context is from a tag exception generated by applying the key naming rules to a parsed key name string and the human localization expert can add additional comments regarding the key name that triggered the exception. In the example shown, the bug report can be routed to the content development network team (Cdns). In some cases, the developer has access to key resources tools. In some implementations, interim translation will proceed using the faulty key name to avoid slowing down delivery of a new release of an app, and in the next release the developers will have responded to the bug report, so that the code is improved and the key is more descriptive.

FIG. 5 shows an example localization verification tool (LVT) 116 that includes post-merge sanitization check tool 118 interface configurable to compare the new localization kit version 512—a sanitized localization kit into which the sanitization correction files have been merged, to the original or preliminary localization kit 522. In the example, 2017-01-19full includes the extracted ISMSG tags that the human localization expert performing a text normalization or sanitization worked on. The human localization expert finished sanitization on 2017-1-30 and a merge was performed to insert the sanitized code into an updated codebase. Then an extract was performed to generate a final localization kit against which a comparison can be run.

Figure 6A:
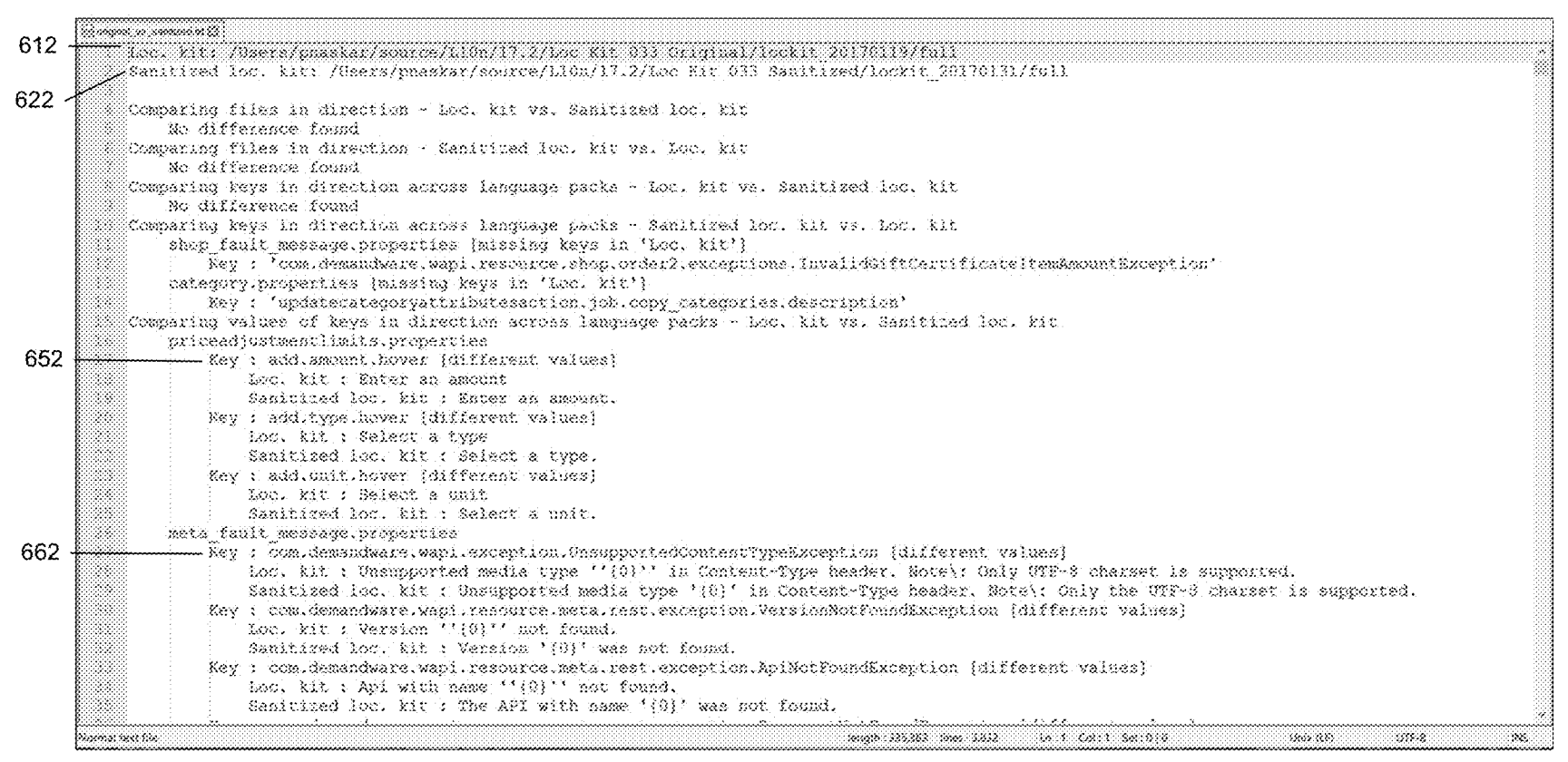

The report shown in FIG. 6A makes it possible for the QA tester 304 to manually compare reported applications of sanitization to intended changes, looking at two documents at time: the report and each of the sanitization files submitted for merge. In one example, twenty sanitization files are submitted for merge. In some implementations the comparison can be automated. Different results follow from comparison of different versions of the localization kit. For instance, a user can select the New, Changed, or Full extractions against which to run comparisons. The example report 600 shows the results for comparing original kit FULL 612 and sanitized kit FULL 622, showing where the results are the same and where they are not the same. The sanitized kit contents should match what was sent back to development, confirming that changes have been incorporated by the engineering team of developers. Three key messages show keys with different values because a period has been added to the end of the sentences 652. Several key messages 662 appear because single quotes are not found, resulting in "different values" messages in report 600 because the developer changed two single quotes to one double quote. The report only shows differences between original full and sanitized full. In one implementation, additional programming can automatically check that all of the keys in the sanitization file have been updated.

FIG. 6B shows an example sanitization correction file before corrections have been applied. In this example, for preferences new 2017-02-27.properties bundle 602, brackets 606 are used and need to be replaced with apostrophes in line 4 604. Additionally, in line 5 605, the word value 608 needs to be capitalized. FIG. 6C shows the changes to be applied to correct the errors—that is, the sanitized properties. Line 4 is commented out, and line 5 632 is added to replace line 4, to replace the brackets with apostrophes 638. Line 7 is commented out and replaced with line 8 642, to replace the lower case v in 'value' with an upper case V 648. FIG. 6D shows the key-value pairs after sanitization: the apostrophes 678 and the word 'Value' 688 are represented correctly in the sanitized version of the localization kit.

Figure 7A:
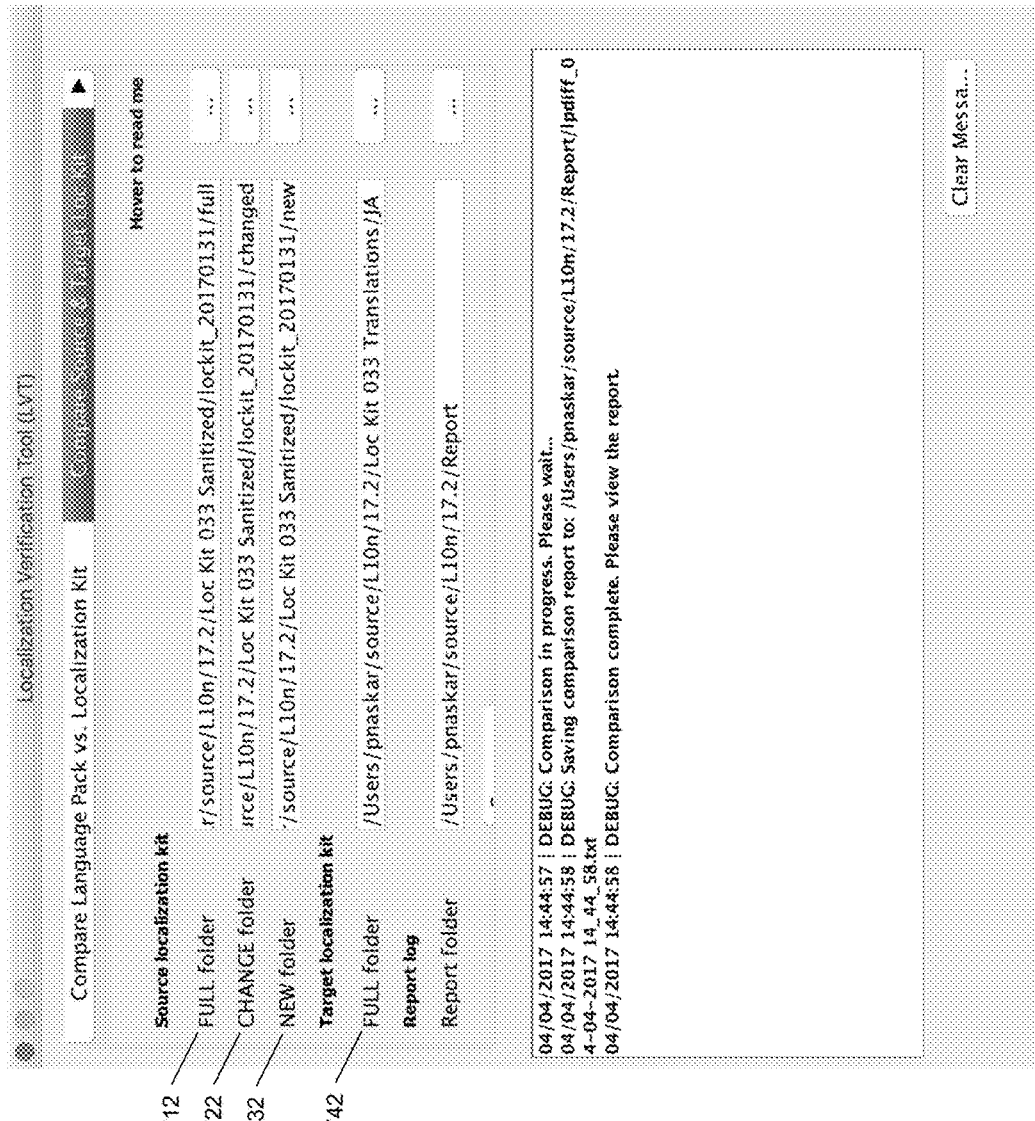
FIG. 7A shows an example post-merge sanitization check tool configurable to compare the sanitized source localization kit with a localization kit translated into a target language and delivered by a translator.

FIG. 7A shows an example comparison of source and target localization kits via localization verification tool (LVT) 116 that includes post-merge sanitization check tool 118 and translation verification tool 119. LVT is configurable to compare the sanitized localization kit full 712, changed 722 and new 732 with the target localization kit 742 provided by the translator. In one implementation, localization verification tool 119 can forward a final localization kit to a human translator that includes extracted tags that have at least a key name and a translatable text string in an original language; and receive a translated kit from the human translator that includes the extracted tags that have an added or replaced translated text string and present the translated kit to a human localization expert. Translation verification tool 119 runs a change confirmation tool that compares the translated target localization kits with the final source localization kit that counts, compares and reports total numbers of files in the translated kits with the final source localization kit; compares and reports differences in key content between corresponding files in the translated kit with the final localization kit; and compares and reports differences in parameters-in-values between corresponding files in the translated kit with the final localization kit; accept edits to the translatable text from the human localization expert; and commits a final translated kit to persistent storage.

FIG. 7B shows a report of results of running the tool shown in FIG. 7A, showing four fewer files in target 765. In this case, the localization process owner intentionally asked to suppress four files they did not want translators to work on yet—for new features under development. In one use case, error messages are displayed in English only, because no error codes are translated, and messages use single quotes for reasons intrinsic to the API: double single quotes are rendered as a double quote, a character that would break the code. The tool also can check code placeholders where values get pulled in, to ensure that no code was corrupted by the translation. The report in FIG. 7B shows results with no differences found 776 between what was sent and what was received back, which is the desired result.

Translation verification tool 119 can iterate over forwarding a revised version of the final localization kit, receiving a revised version of the translated kit, running the change confirmation tool and accepting edits to the translatable text, leading to the committing of a final translated kit. In some implementations, the final localization kit and the translated kit, include separate folders: a full folder of a full set of extractions from the code base; a changed folder of extractions of tags that changed after a prior extraction from the code base; and a new folder of extractions of tags that were not present on the code base when the prior extraction took place.

Figure 8:
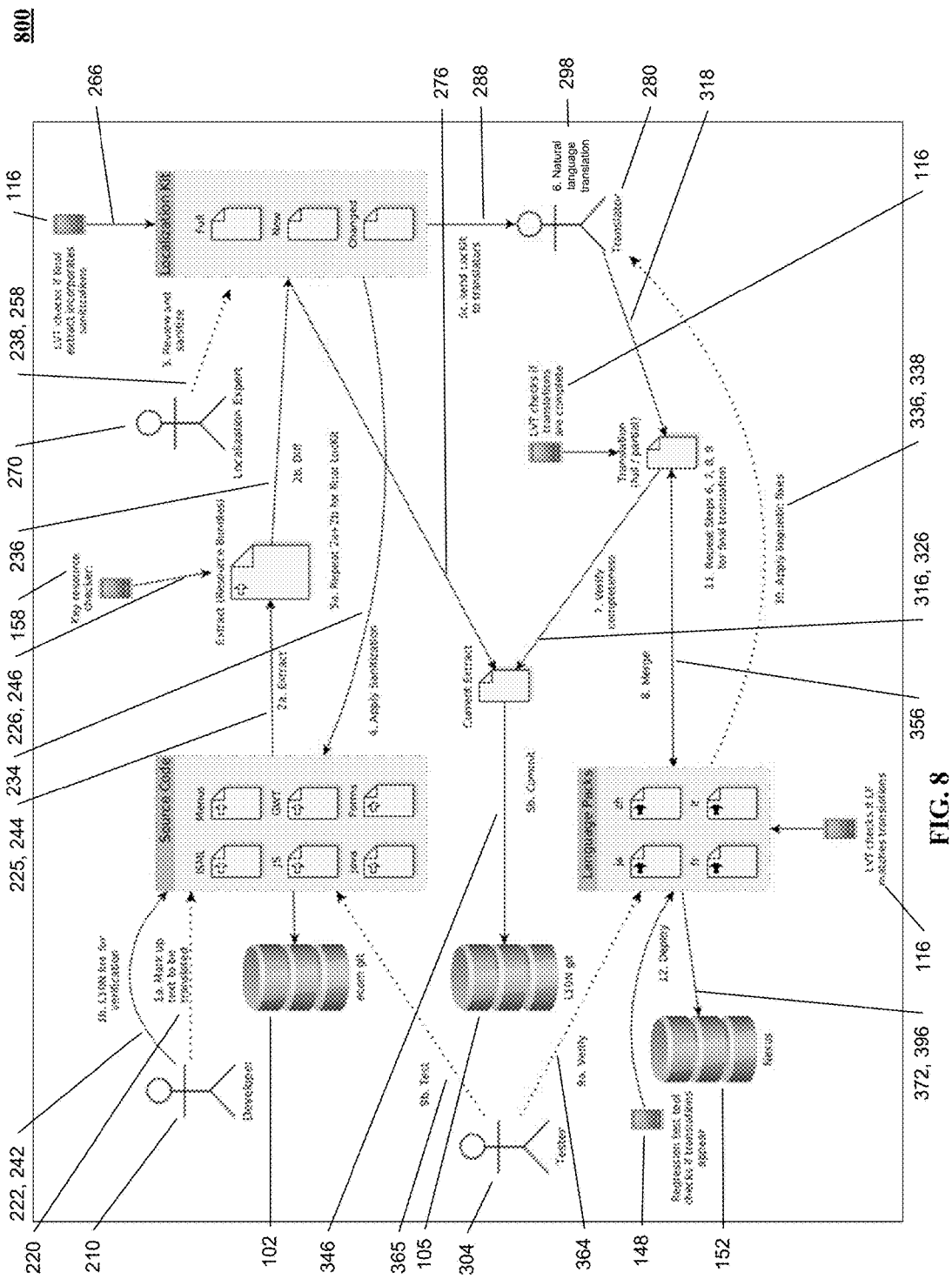
FIG. 8 shows an overview of the process for accurately translating elements of a web application into multiple languages.

FIG. 8 shows an overview of the process 800 for accurately translating elements of a web site into multiple languages, and delivering language packs to production servers for production use—as shown in the workflows of FIG. 2 and FIG. 3 and described in detail supra. Customers of an app are able to see the language pack contents. Time stamps, date stamps, and currency can be different for different locales. In one implementation, folders of bundled files include one set of files per locale; in one example, German locales include Austria, Liechtenstein, and Luxembourg.

Figure 9B:
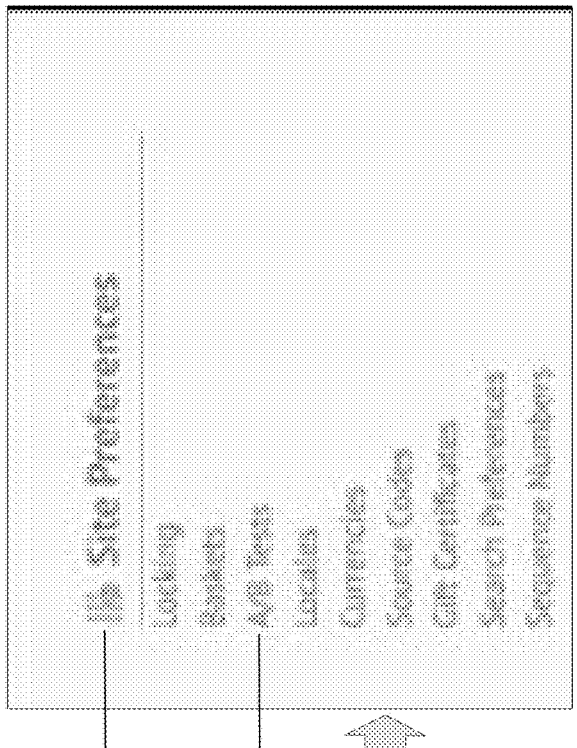
FIG. 9B shows a UI segment visible after selection of the Site Preference module in the US segment of the web application in FIG. 9A.
Figure 9D:
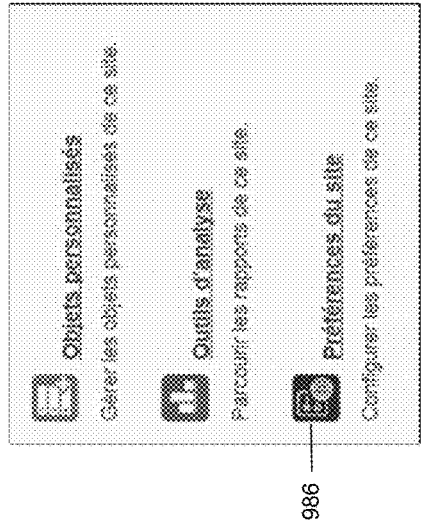
FIG. 9D shows the example UI from the web application of FIG. 9A, after translation into the French language.
Figure 9A:
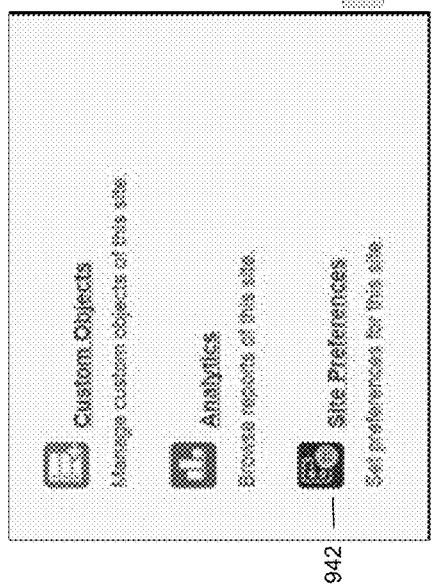
FIG. 9A shows an example user interface (UI) segment of elements to be translated.
Figure 9C:
FIG. 9C shows the example UI segment of FIG. 9A, after translation into Italian language.
Figure 10A:
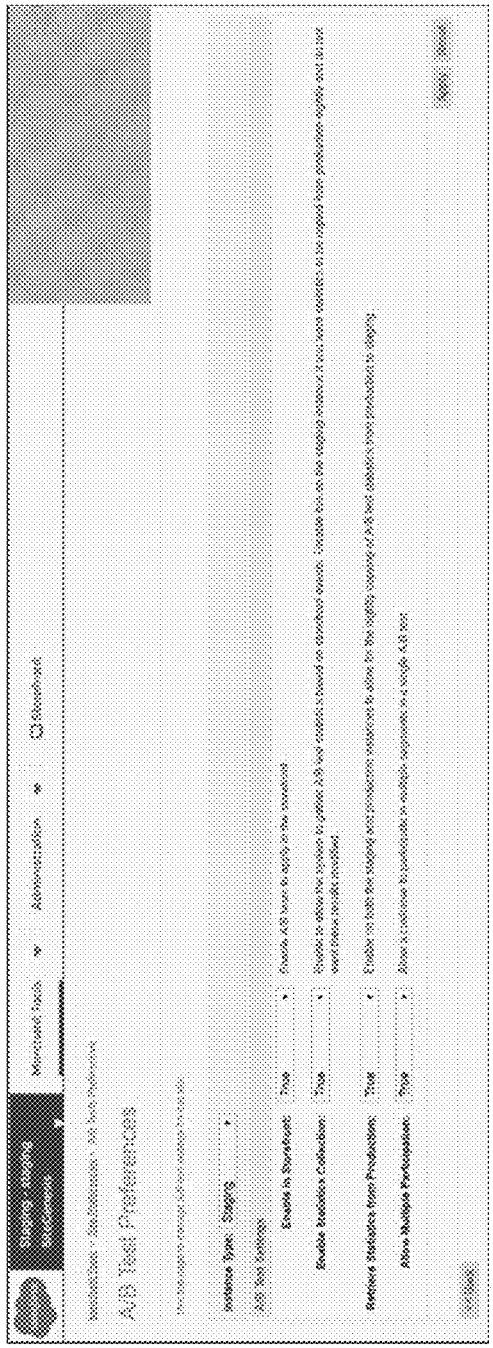
FIG. 10A shows an example A/B site preferences module from the web application displayed in English.
Figure 10B:
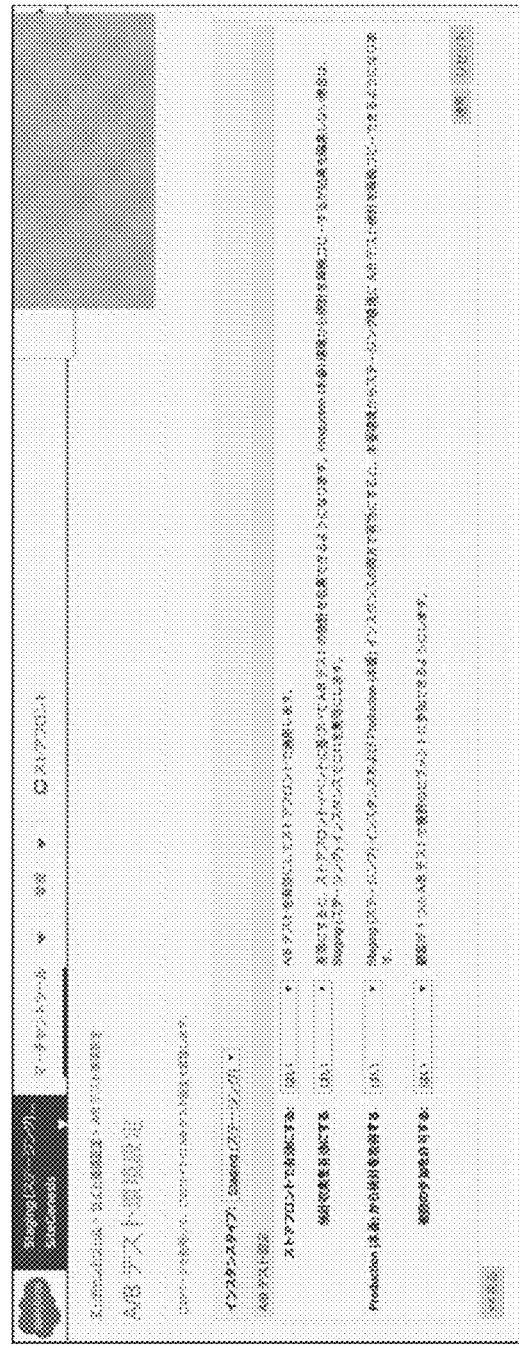
FIG. 10B shows A/B site preferences translated into Japanese.

Language packs can be deployed independent of code. To ensure that keys that are no longer in use do not get deleted, the language pack merges the newly translated language packs with the previously deployed language packs. That is, a key that is no longer needed for translation may still be in the code, and translations cannot be allowed to break the code that delivers the application. In one example, in French all words should be translated, except perhaps the company name. In contrast, in Italian many English words are used, e.g. ok. In another example, Japanese transliterates English words sometimes, using the closest corresponding letters of their alphabet. An example app interface page that needs to be translated into multiple languages is described next. FIG. 9A shows an example user interface (UI) segment of elements to be translated, including Site Preferences 942. FIG. 9B displays the UI segment of Site Preferences 926 which includes A/B Tests 936, visible after selection of Site Preferences 942 in FIG. 9A. FIG. 9C displays, in Italian, the example UI segment of FIG. 9A, including "Preferenze del situ" 982. FIG. 9D shows the example UI segment of FIG. 9A, after translation into the French language, "Preferences du site" 986. FIG. 10A displays the UI content visible after selection of A/B tests 936 in Site Preference 926, and FIG. 10B displays A/B test site preferences translated into Japanese.

Figure 11A:
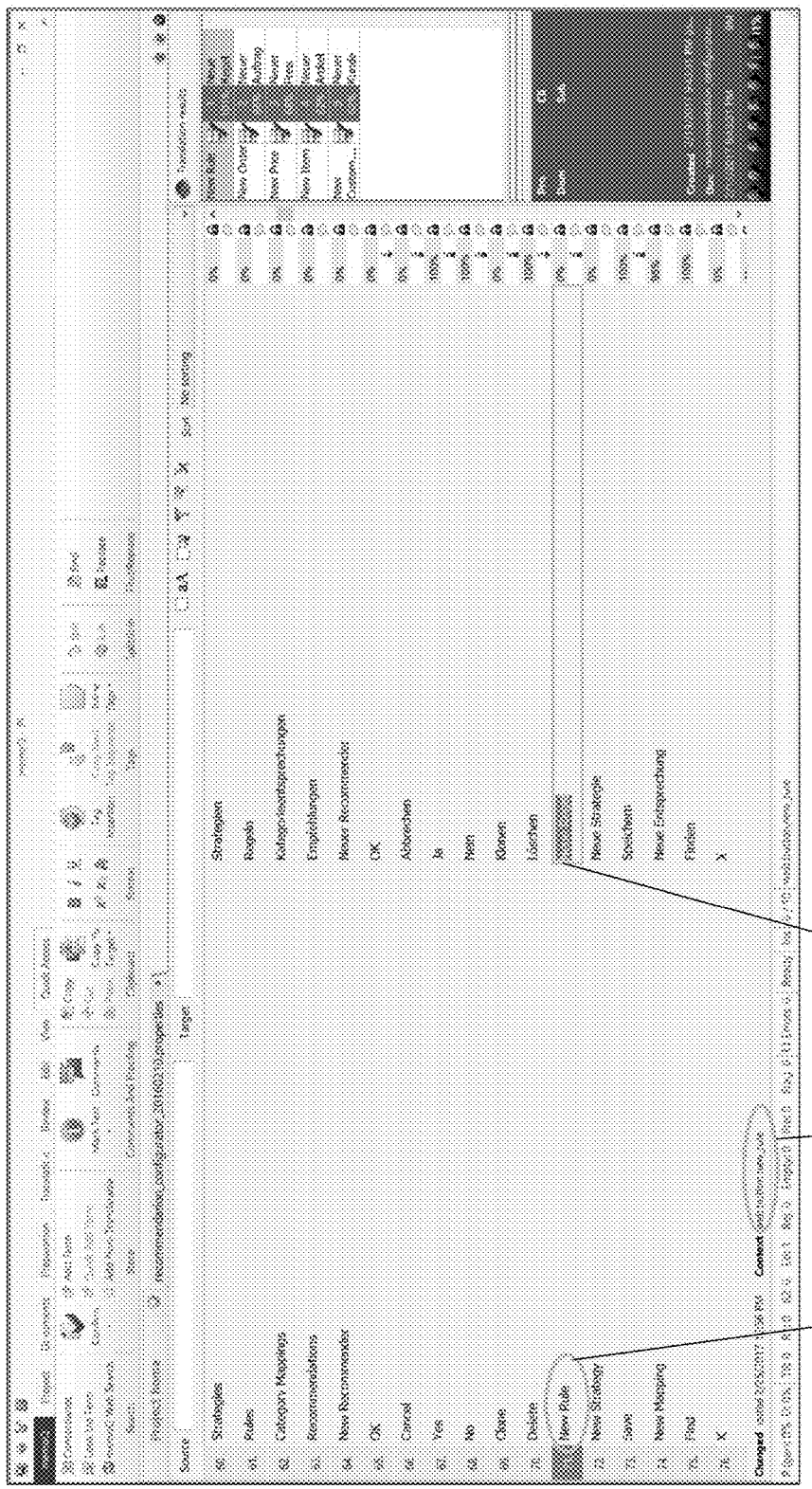
FIG. 11A displays an example use of unique keys to identify the contextual location of a text string that is being translated in a computer-aided translation tool (CAT).
Figure 11B:
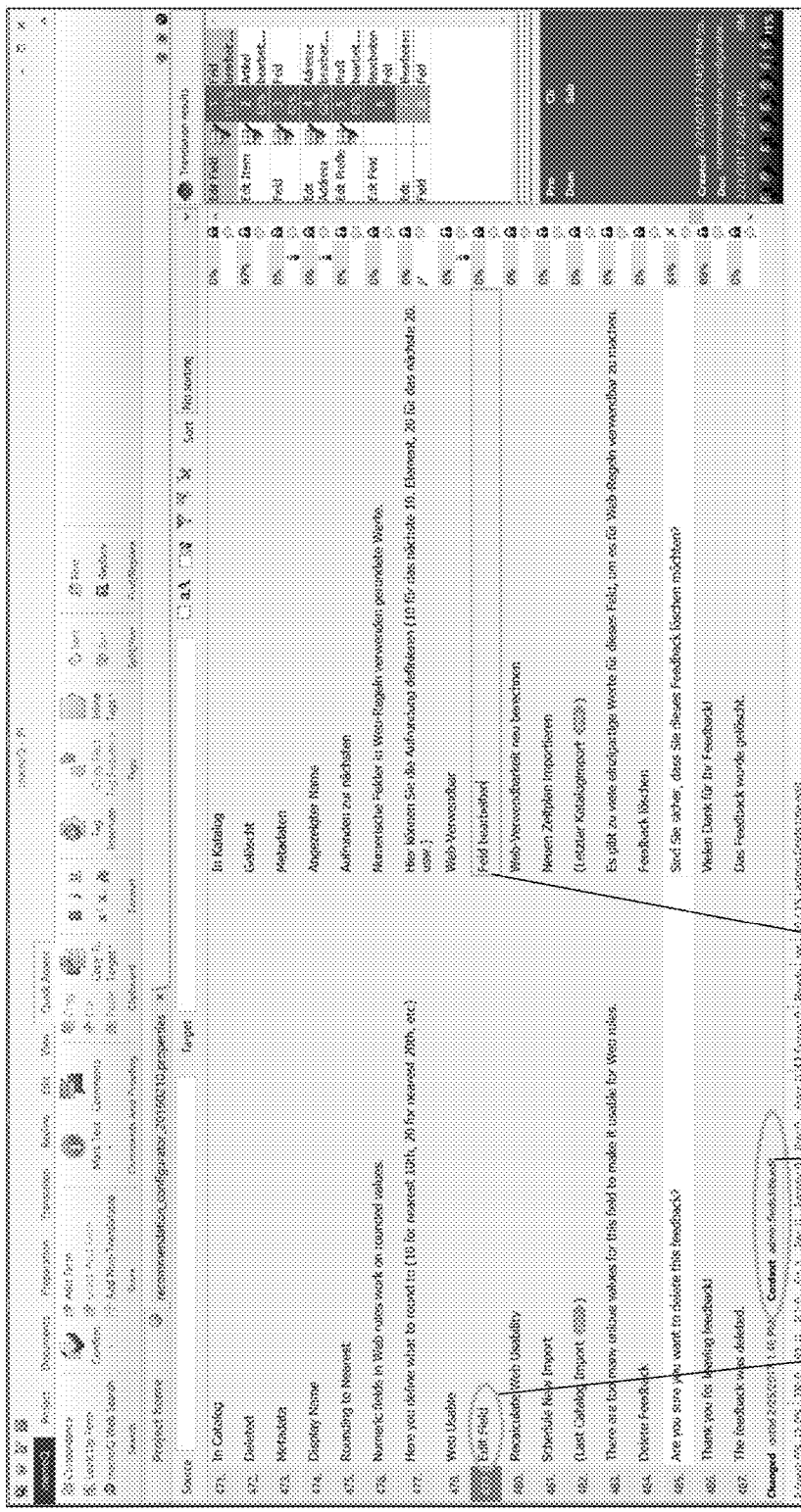
FIG. 11B shows a second example of keys to identify the contextual location of a text string that is being translated in a CAT.

Translators use commercially available tools to support translation actions. In one implementation memoQ is usable by translators, who can use the disclosed technology to view key names that identify the location on the web panel in the app being translated to unambiguously identify the text string to be translated in the application UI. FIG. 11A and FIG. 11B show examples of the power of keys: the unique keys show translators the context of each text string. In the example shown in FIG. 11A, web.button.new rule 1144 gives information about where the text to be translated is located, supporting the translator in fixing the correct string. The text string on line 71 is listed in English 1122 and a translation into German 1126 in this example. In the example shown in FIG. 11B, When line 479 gets selected for review, admin.fields.title.edit 1154 gives location information for the text to be translated, to facilitate fixing the correct string. The text string is listed both in source language English 1132 and in target language German 1136. In another implementation, the human translator may utilize a different commercially available tool, such as Trados as the computer-assisted translation software suite.

After discussion by the translators 280 and QA tester 304 during the joint walkthrough 376, translators fix identified errors, and the translation company sends back an updated set of "fixed" files. FIG. 12A shows a UI for setting up the comparison of translated localization kit fixes 1222 to an existing language pack 1212. The localization kit files are persisted and the directory in which the files are persisted is specified. The comparison considers the presence of files, the presence of keys, a comparison of values and the presence of expected parameters in values. FIG. 12B shows a fixes comparison report for a French translation, with an example key for menu.actio.site-prefs_search.name having fixed accent marks 1252.

The LVT includes a tool for comparing the original language pack to the final language pack, after all fixes have been completed. FIG. 12C shows a report UI for comparing a newly-built language pack 1215 to the original language pack 1225 and FIG. 12D shows an example report resulting from the comparison on an original Chinese language pack 1224 to the new Chinese language pack 1214. FIG. 12D shows a difference 1254 between the original LP for Chinese and the final LP. One string does not match. In one case, this may be because the final LP absorbed a fix that the translator made after in-context testing or because of a build error. The QA tester who runs the tool makes the determination as to whether this difference between the LPs is expected as a desired linguistic fix or whether it may be a build defect. The comparison of parameters give a "no differences found" message in cases in which the parameters in the packs are the same.

In one implementation, the disclosed technology can include a live-edit-mode for translators, usable to capture any edits translators complete locally in the application server that runs the test session. When the test session is finished, all captured changes can be exported and then imported into memoQ or another computer-assisted translation software suite.

Debug tools 128 include a verification-in-context tool that supports debugging of a language pack that holds translations of text, which was extracted in source language tags from web app panels, the translations proceeding from a source language into multiple target languages, and translated target language tags logically or physically merged back into the web app panels from which they were extracted. The verification-in-context tool is configurable to audit web app panels to verify translation into a selected target language by identifying text, on a web app panel, which renders in the web app panel, determining whether each identified text was contained in a source language tag that was extractable for translation, determining whether processing of each source language tag produced a target language tag that was merged, logically or physically, back into the web app panel after translation, and providing access, linking instances of identified text that were merged back into the web app panel after translation, and supplemental source tag information that was present in respective source language tags before translation.

Figure 14A:
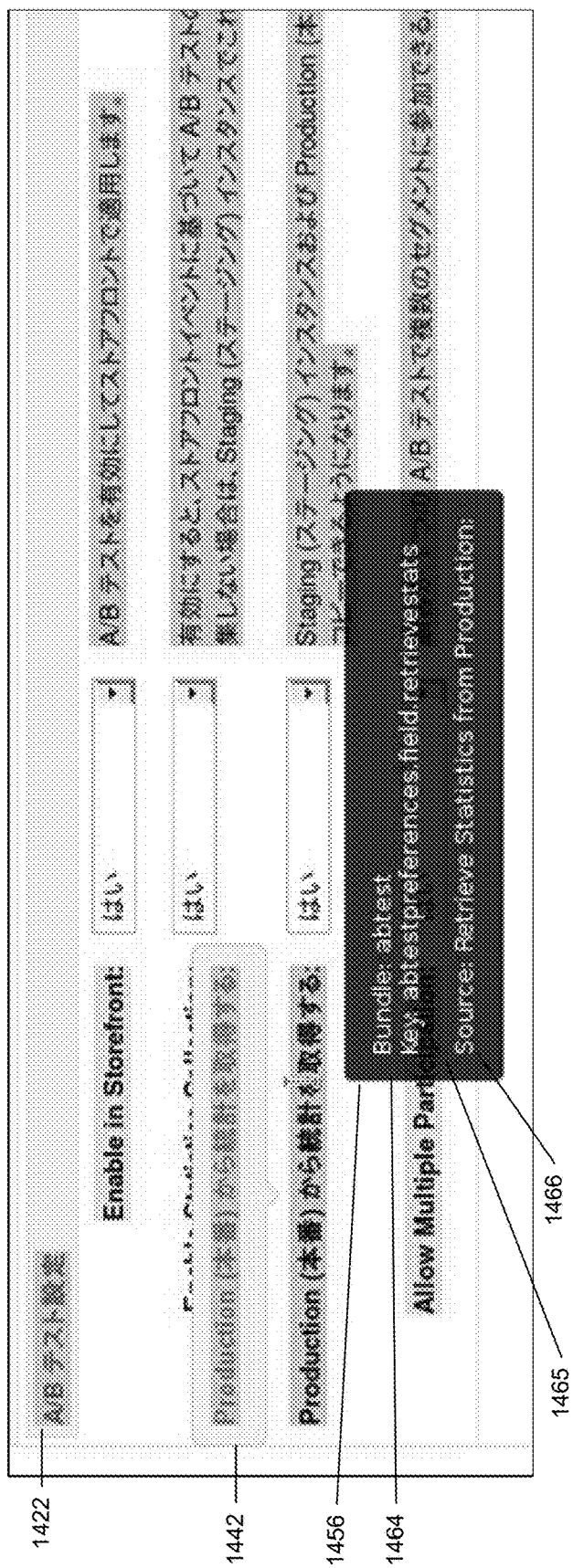
FIG. 14A shows a view, of the debug mode panel shown in FIG. 13, which displays supplemental source tag information.

FIG. 13 shows one implementation of debug mode, for a translation into Japanese. The verification-in-context tool causes display of web app panels in the selected target language, with each web app panel encoded to visually indicate, when viewed, which identified text on the web app panel was not extracted 1334; which extracted text was not translated 1324, 1354; and which extracted text was merged back into the web app panel after translation 1344. FIG. 14A shows another view of the debug mode panel shown in FIG. 13, which displays supplemental source tag information 1456 for extracted text merged back into the web app panel after translation 1344. In some implementations of debug mode, the user can hover over a text string of interest 1442 on the web app panel for AB 1422, and supplemental source tag information gets displayed: a bundle abtest 1464 to which the source language tag belongs, a key name abtest-preferences.field.retrievestats assigned to the source language tag 1465—, and translatable text in the source language 1466—"Retrieve Statistics from Production". In debug mode, translators can confirm that they are manipulating the intended string by viewing the key name of the string in their CAT tool. In yet another use case, debug mode can include markup of text strings that have been extracted, so that text that has not yet been extracted becomes more obvious. In some implementations, debug mode can show key names without the need to hover over a string of text.

Figure 14B:
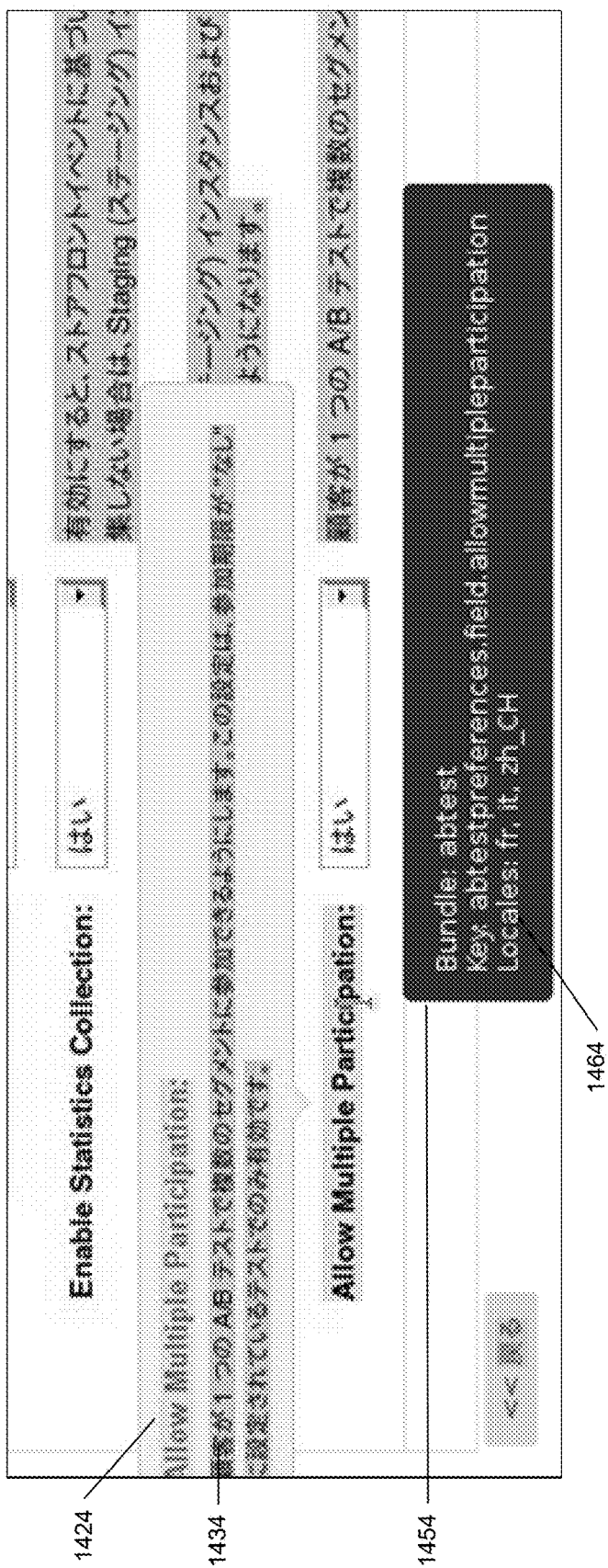
FIG. 14B shows a help screen usable during walkthroughs by a QA tester and multiple human translators, in one implementation.

FIG. 14B shows a help screen usable during walkthroughs by a QA tester and multiple human translators, in one implementation. The 'allow multiple participation' label 1424 was extracted but does not display as translated, and the translated text 1434 is included as helpful text to inform the translators. Popup text 1434 belongs to the web page, and is a help text referring to text label 1424. This popup has, as a title, the name of the label, and then the help text. As part of the application this help text popup is also handled by the debug mode so extracted and translated text as visually identified. The supplemental source tag information 1454 shows the languages for which a translation exists 1464— three languages for this language pack.

Workflow

Figure 15:
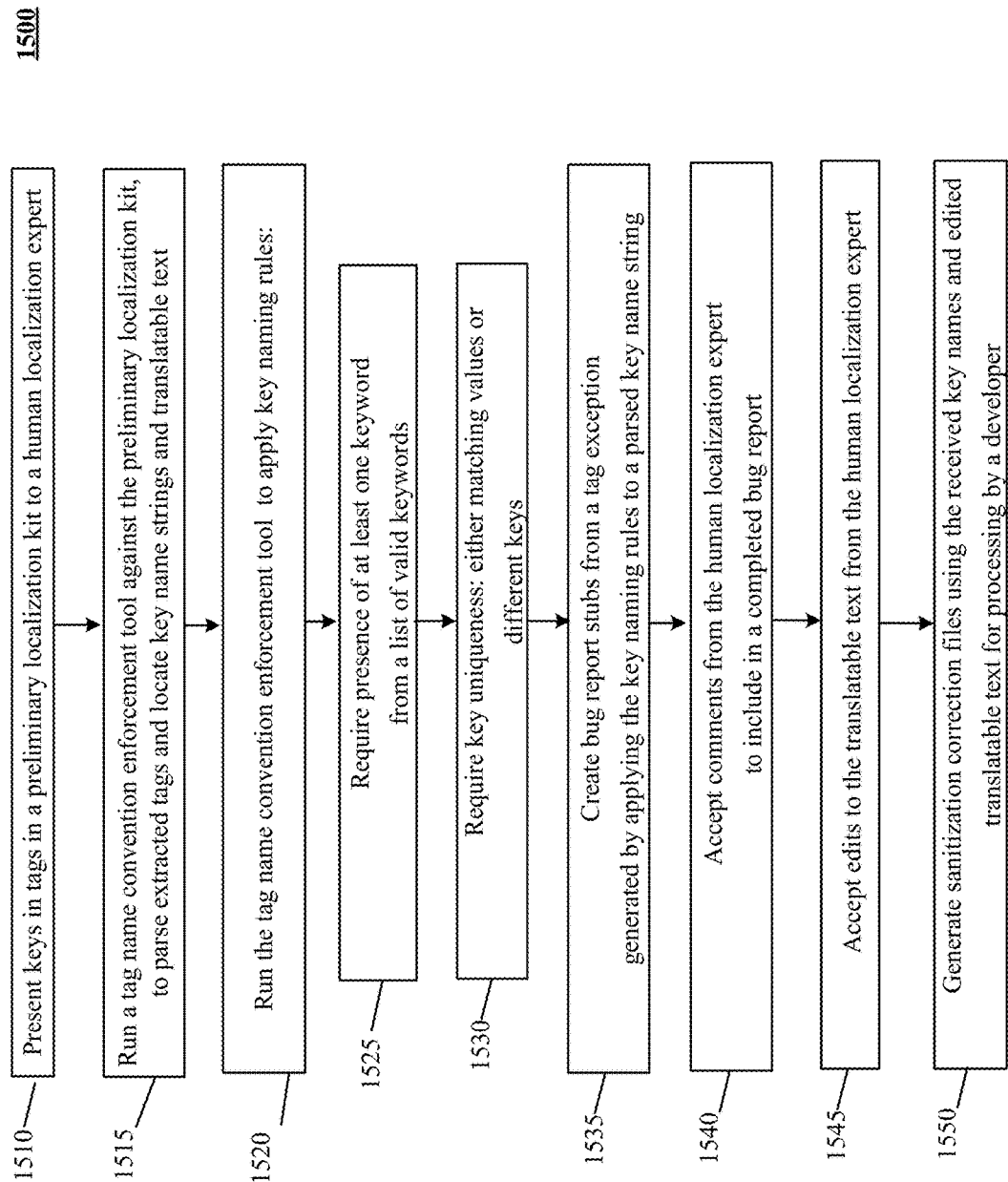
FIG. 15 is an example workflow of one implementation of an environment for accurately translating elements of a web application.

FIG. 15 is a flowchart 1500 of one implementation of an environment for accurately translating elements in a web application, adapting internationalized software for a specific region or language by adding locale-specific components and translating text. Flowchart 1500 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 15. Multiple actions can be combined in some implementations. For convenience, this flowchart is described with reference to a method.

At action 1510, present keys in a preliminary localization kit to a human localization expert.

At action 1515, run a tag name convention enforcement tool against the preliminary localization kit, to parse extracted keys and locate key name strings and translatable text, and at action 1520, apply key naming rules.

At action 1525, require presence of at least one keyword from a list of valid keywords to assure meaningful and consistent naming of the keys.

At action 1530, require key uniqueness: either matching values or different keys.

At action 1535, create bug report stubs for completion by the human localization expert, including in the bug report stub context from a key exception generated by applying the key naming rules to a parsed key name string and at action 1540 accept additional comments from the human localization expert to include in a completed bug report, regarding the key name that triggered the exception.

At action 1545, accept comments from the human localization expert to include in a completed bug report.

At action 1550, generate sanitization correction files using the received key names and edited translatable text for processing by a developer.

The actions described above can be subdivided into more steps or combined into fewer steps to carry out the method described using a different number or arrangement of steps.

Multi-Tenant Integration

Figure 16:
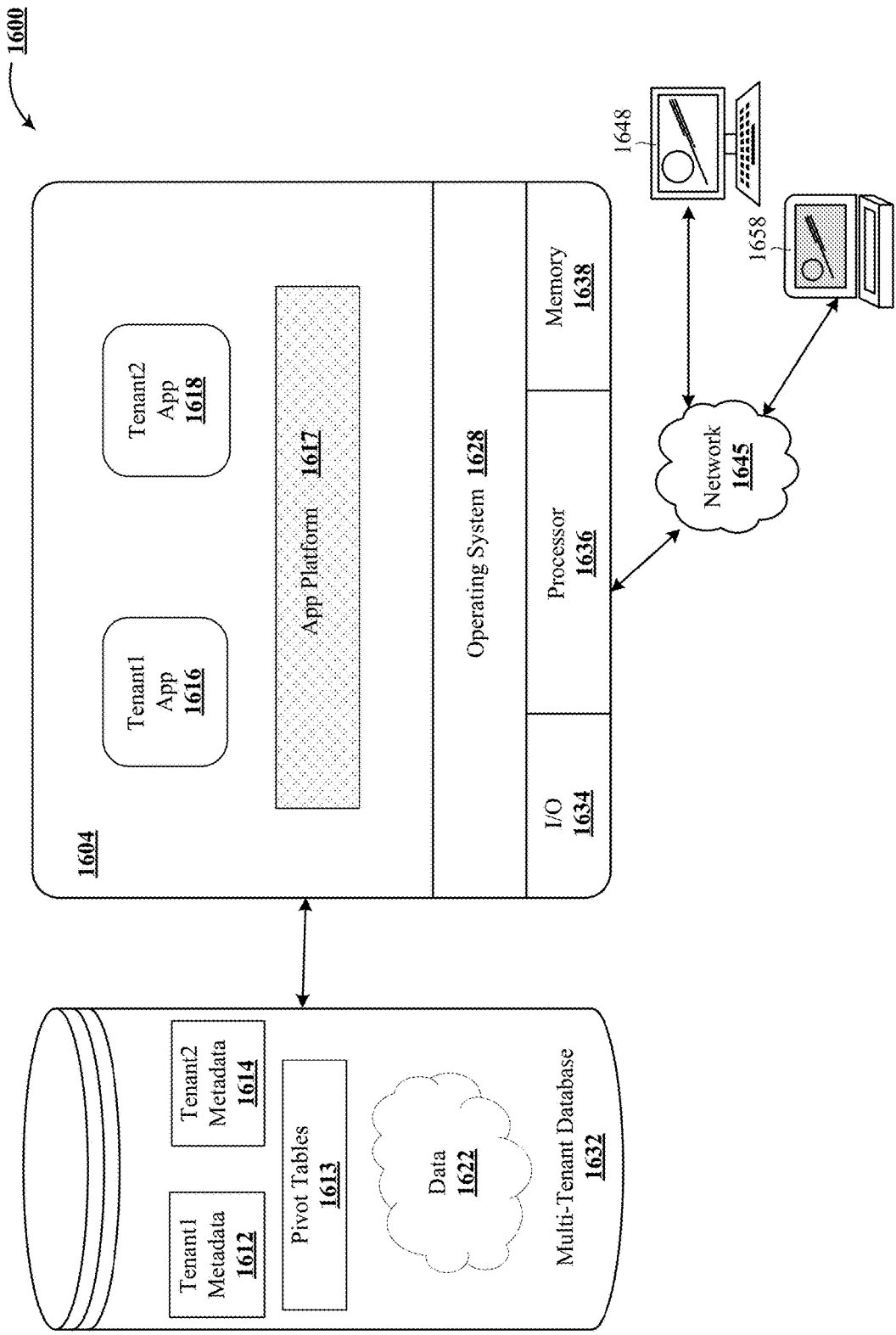
FIG. 16 shows a system environment for implementing a hardware system used to accurately translate elements of a web application.

FIG. 16 presents a block diagram of an exemplary multi-tenant system 1600 suitable for implementing environment 100 of FIG. 1 for accurately and efficiently translating large web applications into multiple languages, via internationalization and localization. In general, the illustrated multi-tenant system 1600 of FIG. 16 includes a server 1604 that dynamically supports virtual applications 1616 and 1618, based upon data 1622 from a common database 1632 that is shared between multiple tenants, alternatively referred to herein as a "multi-tenant database". Data and services generated by the virtual applications 1616 and 1618, including GUI clients, are provided via a network 1645 to any number of client devices 1648 or 1658, as desired.

As used herein, a "tenant" or an "organization" refers to a group of one or more users that shares access to a common subset of the data within the multi-tenant database 1632. In this regard, each tenant includes one or more users associated with, assigned to, or otherwise belonging to that respective tenant. Stated another way, each respective user within the multi-tenant system 1600 is associated with, assigned to, or otherwise belongs to a particular tenant of the plurality of tenants supported by the multi-tenant system 1600. Tenants may represent users, user departments, work or legal organizations, and/or any other entities that maintain data for particular sets of users within the multi-tenant system 1600. Although multiple tenants may share access to the server 1604 and the database 1632, the particular data and services provided from the server 1604 to each tenant can be securely isolated from those provided to other tenants. The multi-tenant architecture therefore allows different sets of users to share functionality and hardware resources without necessarily sharing any of the data 1622 belonging to or otherwise associated with other tenants.

The multi-tenant database 1632 is any sort of repository or other data storage system capable of storing and managing the data 1622 associated with any number of tenants. The database 1632 may be implemented using any type of conventional database server hardware. In various implementations, the database 1632 shares processing hardware with the server 1604. In other implementations, the database 1632 is implemented using separate physical and/or virtual database server hardware that communicates with the server 1604 to perform the various functions described herein. The multi-tenant database 1632 may alternatively be referred to herein as an on-demand database, in that the multi-tenant database 1632 provides (or is available to provide) data at run-time to on-demand virtual applications 1616 or 1618 generated by the application platform 1617, with tenant1 metadata 1612 and tenant2 metadata 1614 securely isolated.

In practice, the data 1622 may be organized and formatted in any manner to support the application platform 1622. In various implementations, conventional data relationships are established using any number of pivot tables 1613 that establish indexing, uniqueness, relationships between entities, and/or other aspects of conventional database organization as desired.

The server 1604 is implemented using one or more actual and/or virtual computing systems that collectively provide the dynamic application platform 1617 for generating the virtual applications. For example, the server 1604 may be implemented using a cluster of actual and/or virtual servers operating in conjunction with each other, typically in association with conventional network communications, cluster management, load balancing and other features as appropriate. The server 1604 operates with any sort of conventional processing hardware such as a processor 1636, memory 1638, input/output features 1634 and the like. The input/output 1634 generally represent the interface(s) to networks (e.g., to the network 1645, or any other local area, wide area or other network), mass storage, display devices, data entry devices and/or the like. User interface input devices 1634 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 1617.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 1636 to the user or to another machine or computer system.

The processor 1636 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1638 represents any non-transitory short or long term storage or other computer-readable media capable of storing programming instructions for execution on the processor 1636, including any sort of random access memory (RAM), read only memory (ROM), flash memory, magnetic or optical mass storage, and/or the like. The computer-executable programming instructions, when read and executed by the server 1604 and/or processor 1636, cause the server 1604 and/or processor 1636 to create, generate, or otherwise facilitate the application platform 1617 and/or virtual applications 1616 and 1618, and perform one or more additional tasks, operations, functions, and/or processes described herein. It should be noted that the memory 1638 represents one suitable implementation of such computer-readable media, and alternatively or additionally, the server 1604 could receive and cooperate with external computer-readable media that is realized as a portable or mobile component or application platform, e.g., a portable hard drive, a USB flash drive, an optical disc, or the like.

The application platform 1617 is any sort of software application or other data processing engine that generates the virtual applications 1616 and 1618 that provide data and/or services to the client devices 1648 and 1658. In a typical implementation, the application platform 1617 gains access to processing resources, communications interfaces and other features of the processing hardware using any sort of conventional or proprietary operating system 1628. The virtual applications 1616 and 1618 are typically generated at run-time in response to input received from the client devices 1648 and 1658.

With continued reference to FIG. 16, the data and services provided by the server 1604 can be retrieved using any sort of personal computer, mobile telephone, tablet or other network-enabled client device 1648 or 1658 on the network 1645. In an exemplary implementation, the client device 1648 or 1658 includes a display device, such as a monitor, screen, or another conventional electronic display capable of graphically presenting data and/or information retrieved from the multi-tenant database 1632.

In some implementations, network(s) 1645 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZIGBEE, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an ORACLE™ compatible database implementation, an IBM DB2 ENTERPRISE SERVER™ compatible relational database implementation, a MySQL™ or POSTGRESQL™ compatible relational database implementation or a MISCROSOFT SQL SERVER™ compatible relational database implementation or a NoSQL non-relational database implementation such as a VAMPIRE™ compatible non-relational database implementation, an APACHE CASSANDRA™ compatible non-relational database implementation, a BIGTABLE™ compatible non-relational database implementation or an HBASE™ or DYNAMODB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

Some particular implementations and features are described in the following discussion.

One implementation of a disclosed method for implementing a sanitization and exception generation tool set configurable for presenting tags of text for translation, extracted from a code base of a web application, in a preliminary localization kit, for sanitization and exception generation by a human localization expert includes running a tag name convention enforcement tool against the preliminary localization kit, to parse the tags to extract key name strings and translatable text, and then validating the extracted key name strings using key naming rules that require presence of at least one keyword from a list of valid keywords and that require key uniqueness. The method also includes creating at least one bug report stub for completion by the human localization expert, including in the bug report stub, context from a tag exception generated using the key naming rules to validate the key name strings and accepting additional comments from the human localization expert to add to the bug report stub, regarding the key name that triggered the exception. The method further includes accepting edits to the translatable text from the human localization expert; and generating a sanitization correction file using the key names received and edited translatable text, for a developer to merge into the code base of the web application.

This method and other implementations of the technology disclosed can include one or more of the following features and/or features described in connection with additional methods disclosed. In the interest of conciseness, the combinations of features disclosed in this application are not individually enumerated and are not repeated with each base set of features.

For the disclosed method, key uniqueness is satisfied when all tags having a particular key name share matching translatable text, and the valid keywords consistently match a part of speech within a natural language. In one case, the valid keywords consistently match elements of the user interface that require a specific grammar when translated into another natural language. The valid keywords provide GUI element context that matches where translatable text was extracted from. The key names for GUI element context invoke, for each target language of the translation, a style guide that specifies a grammatical form in a target natural language into which the translatable text is to be translated.

The key names also include context of a module name and a GUI element from which the translatable text was extracted. The context helps in locating the sting in the GUI, especially in large web applications with thousands of panels.

Some implementations of the disclosed method further include implementing a post-merge sanitization check tool configurable for comparing kit versions using the preliminary localization kit and a post-merge sanitized localization kit, extracted from the code base after a merge by a developer, wherein the post-merge sanitization check tool runs a change confirmation tool that compares a selected preliminary localization kit with the sanitized localization kit counting, comparing and reporting total numbers of files in the preliminary localization kit and the sanitized localization kit; comparing and reporting differences in key content between corresponding files in the preliminary localization kit and the post-merge sanitized localization kit; comparing and reporting differences in parameters-in-values between corresponding files in the preliminary localization kit and the sanitized localization kit; and following approval of the post-merge sanitized localization kit, generating a final localization kit to send to a translator.

Some implementations of the disclosed method include, in each of the preliminary localization kit and the post-merge sanitized localization kit, as separate folders: a full folder of a full set of extractions from the code base; a changed folder of extractions of tags that changed after a prior extraction from the code base; and a new folder of extractions of tags that were not present in the code base when the prior extraction took place. In some cases the post-merge sanitization check tool is further configurable to iteratively report exceptions from the counting and comparing for correction and then to repeat the counting and comparing against an updated sanitized localization kit.

One disclosed method of verifying correctness of files used in translation of a code base of a web application includes a translation verification tool set configurable for forwarding a final localization kit to a human translator that includes tags, extracted from a code base of a web application, that have at least a key name and a translatable text string in an original language; and receiving a translated kit from the human translator that includes the extracted tags that have an added or replaced translated text string and present the translated kit to a human localization expert. In one case, the extracted tags each have a text string replaced with the translation. The method also includes running a change confirmation tool that compares the translated kit with the final localization kit—counting, comparing and reporting total numbers of files in the translated kit with the final localization kit; comparing and reporting differences in key content between corresponding files in the translated kit with the final localization kit; and comparing and reporting differences in parameters-in-values between corresponding files in the translated kit with the final localization kit. The method further includes accepting edits to the translatable text from the human localization expert; and committing a final translated kit to persistent storage.

Some disclosed implementations of the method further include implementing a post-merge sanitization check tool configurable for comparing kit versions using the preliminary localization kit and a post-merge sanitized localization kit, extracted from the code base after a merge by a developer, wherein the post-merge sanitization check tool runs a change confirmation tool that compares a selected preliminary localization kit with the sanitized localization kit. The method also includes counting, comparing and reporting total numbers of files in the preliminary localization kit and the sanitized localization kit; comparing and reporting differences in key content between corresponding files in the preliminary localization kit and the post-merge sanitized localization kit; comparing and reporting differences in parameters-in-values between corresponding files in the preliminary localization kit and the sanitized localization kit; and following approval of the post-merge sanitized localization kit, generating a final localization kit to send to a translator.

One implementation of a disclosed method that supports debugging of a language pack that holds translations of text, which was extracted in source language tags from web app panels, the translations proceeding from a source language into multiple target languages, and translated target language tags logically or physically merged back into the web app panels from which they were extracted, the verification-in-context tool includes code running on a processor that implements a verification-in-context tool configurable for auditing web app panels to verify translation into a selected target language by identifying text, on a web app panel, which renders in the web app panel, determining whether each identified text was contained in a source language tag that was extractable for translation, determining whether processing of each source language tag produced a target language tag that was merged, logically or physically, back into the web app panel after translation, and providing access, linking instances of identified text that were merged back into the web app panel after translation, and supplemental source tag information that was present in respective source language tags before translation. The disclosed method also includes causing display of web app panels in the selected target language, each web app panel encoded to visually indicate, when viewed, which identified text on the web app panel was not extracted, which extracted text was not translated, and which extracted text was merged back into the web app panel after translation; causing display of the supplemental source tag information for a particular identified text on the web app panel, which supplemental source tag information includes at least a bundle to which the source language tag belongs, a key name assigned to the source language tag, and translatable text in the source language. In some implementations, display includes the languages for which a translation exists.

For some disclosed implementations, the method further includes, after causing display of the supplemental source tag information on the web app panel, receiving a translated text correction from a user; and persisting the translated text correction for use in the web app panel, in the selected target language. The method can further include causing display of a correction entry area that accepts the translated text correction. For the disclosed method, persisting the translated text correction includes saving the translated text correction in a format importable by a computer assisted translation tool. Persisting the translated text correction can also include updating the identified text in the translated target language tag used by the web app panel and persisting the updated translated target language tag. Some implementations of the method further include causing display of the supplemental source tag information in a floating window, that overlays the web app panel, without changing the web app panel. The disclosed method further includes causing display of the supplemental source tag information in an area set aside for the supplemental source tag information. For some disclosed implementations of the method, each web app panel is further encoded to visually indicate a natural language string in the source language that appears in identified text, alongside a string in the target language, after translation of portions of the identified text. The method can further include iterating over changes to the web app panels, for the selected language, and generating web application context renderings for human visual inspection to verify that translated characters in translated text strings do not break the web app panels. In some cases, the method further includes iterating over changes to the web app panels, for the selected language, and generating web application context renderings for machine inspection to verify that translated characters in translated text strings do not break the web app panels.

In one implementation, a disclosed verification-in-context tool implements a regression tool set configurable to iterate over changes to the web app panels, for the selected language, and generate web application context renderings for human visual inspection to verify that translated characters in translated text strings do not break the web app panels. In some cases, the regression tool set is configurable to iterate over changes to the web app panels, for the selected language, and generate web application context renderings for machine inspection to verify that translated characters in translated text strings do not break the web app panels.

Yet another implementation may include a non-transitory computer readable media, including program instructions loaded onto the media that, when combined with computer hardware, implement debugging of a language pack that holds translations of text, which was extracted in source language tags from web app panels, the translations proceeding from a source language into multiple target languages, and translated target language tags logically or physically merged back into the web app panels from which they were extracted.

Yet another implementation may include a tangible non-transitory computer readable storage media including computer program instructions that, when combined with computer hardware and executed, cause a computer to implement any of the methods described earlier.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A system for accurately translating elements in a web application adapting internationalized software for a specific region by adding locale-specific components and translating text, comprising:
    a memory; and
    at least one processor coupled to the memory and configured to:
        extract, by a key resource checker accessible via a network, tags of text from a code base of a web application;
        parse, by the key resource checker, the tags of text to extract a key name string and translatable text;
        validate, by the key resource checker, the key name string using a key naming rule, wherein the key naming rule requires a presence of a keyword in a list of valid keywords and a key uniqueness, wherein a keyword identifies a user-interface element in the web application;
        create, by the key resource checker, a bug report stub for completion,
            wherein the bug report stub comprises context from a tag exception generated using the key naming rule to validate the key name string, and
            wherein the bug report stub accepts additional comments to add to the bug report stub regarding the key name string that triggered the tag exception;
        accept, by the key resource checker, edits to the translatable text in the bug report stub; and
        generate, by the key resource checker, a sanitization correction file using the key name string and translatable text, wherein the sanitization correction file comprises corrections to be made to the code base.

2. The system of claim 1, wherein the key uniqueness is satisfied when all tags of text having a particular key name string share matching translatable text.

3. The system of claim 1, wherein the keyword matches a part of speech within a natural language.

4. The system of claim 1, wherein the keyword provides a GUI element context that matches where the translatable text was extracted from.

5. The system of claim 1, wherein the key name string invokes a style guide that specifies a grammatical form in a target natural language into which the translatable text is to be translated.

6. The system of claim 1, wherein the key name string further comprises a context of a module name and a GUI element from which the translatable text was extracted.

7. The system of claim 1, the at least one processor further configured to:
    compare the code base and a post-merge code base, wherein the post-merge code base is extracted from the code base after the corrections in the sanitization correction file are incorporated into the code base;
    determine a total numbers of files in the code base and the post-merge code base;
    determine differences between corresponding files in the code base and the post-merge code base; and
    determine differences in parameters-in-values between corresponding files in the code base and the post-merge code base.

8. The system of claim 7, the at least one processor further configured to:
    display a full folder of a full set of extractions from the code base;
    display a changed folder of extractions of tags that changed after a prior extraction from the code base; and
    display a new folder of extractions of tags that were not present in the code base when the prior extraction took place.

9. The system of claim 1, wherein the tags of text are HTML tags.

10. The system of claim 1, the at least one processor further configured to:
    receive additional comments in the bug report stub regarding the tag exception.

11. A system for accurately translating elements in a web application adapting internationalized software for a specific region by adding locale-specific components and translating text, comprising:
    a memory; and
    at least one processor coupled to the memory and configured to:
        extract, by a localization verification tool accessible via a network, tags of text from a code base of a web application, wherein the tags of text comprise a key name string and translatable text;

display, by the localization verification tool, the tags of text for translation in a final localization kit;
receive translated text strings associated with the tags of text in a translated kit;
compare, by the localization verification tool, total numbers of files in the translated kit and the final localization kit;
determine, by the localization verification tool, differences between corresponding files in the translated kit and the final localization kit; and
determine, by the localization verification tool, differences in parameters-in-values between corresponding files in the translated kit and the final localization kit.

12. The system of claim 11, the at least one processor further configured to:
display a full folder of a full set of extractions from the code base;
display a changed folder of extractions of tags that changed after a prior extraction from the code base; and
display a new folder of extractions of tags that were not present on the code base when the prior extraction took place.

13. The system of claim 11, the at least one processor further configured to:
accept edits to the translatable text;
build a final translated kit; and
commit the final translated kit to persistent storage.

14. The system of claim 11, the at least one processor further configured to:
process the final localization kit with a translation tool to create a machine-translated draft.

15. A computer-implemented method for accurately translating elements in a web application adapting internationalized software for a specific region by implementing a sanitization and exception generation tool set, comprising:
extracting, by a key resource checker via a network, tags of text from a code base of a web application;
parsing, by the key resource checker, the tags to extract a key name string and translatable text;
validating, by the key resource checker, the key name string using a key naming rule, wherein the key naming rule requires a presence of at least one keyword in a list of valid keywords and a key uniqueness and wherein the keyword identifies a user-interface element in the web application;
creating, by the key resource checker, a bug report stub, wherein the bug report stub comprises context from a tag exception generated using the key naming rule to validate the key name string and
wherein the bug report stub accepts additional comments from to add to the bug report stub regarding the key name string that triggered the tag exception;
accepting, by the key resource checker, edits to the translatable text in the bug report stub; and
generating, by the key resource checker, a sanitization correction file using the key name string and translatable text, wherein the sanitization correction file comprises corrections to be made to the code base.

16. The method of claim 15, wherein the key uniqueness is satisfied when all tags of text having a particular key name string share matching translatable text.

17. The method of claim 15, wherein the keyword matches a part of speech within a natural language.

18. The method of claim 15, wherein the key name string further comprises a style guide that specifies a grammatical form in a target natural language into which the translatable text is to be translated.

19. The method of claim 15, further comprising:
comparing the code base and a post-merge code base, wherein the post-merge code base is extracted from the code base after the corrections in the file are incorporated into the code base;
determining total numbers of files in the code base and the post-merge code base;
determining differences between corresponding files in the code base and the post-merge code base;
determining differences in parameters-in-values between corresponding files in the code base and the post-merge code base.

20. The method of claim 15, wherein the tags of text are HTML tags.

21. The method of claim 15, further comprising:
accepting edits to the translatable text;
building a final translated kit; and
committing the final translated kit to persistent storage.

22. The method of claim 15, further comprising:
receiving additional comments in the bug report stub regarding the tag exception.

23. A method of translating elements in a web application adapting internationalized software for a specific region by verifying correctness of files used in translation of a code base of a web application, comprising:
extracting, by a localization verification tool, tags of text from a code base of a web application, wherein the tags of text comprise a key name string and translatable text;
displaying, by the localization verification tool, the tags of text for translation in a final localization kit;
receiving translated text strings associated with the tags of text in a translated kit;
comparing, by the localization verification tool total numbers of files in the translated kit and the final localization kit;
determining, by the localization verification tool differences between corresponding files in the translated kit and the final localization kit; and
determining, by the localization verification tool differences in parameters-in-values between corresponding files in the translated kit and the final localization kit.

24. The method of claim 23, further comprising:
displaying a full folder of a full set of extractions from the code base;
displaying a changed folder of extractions of tags that changed after a prior extraction from the code base; and
displaying a new folder of extractions of tags that were not present on the code base when the prior extraction took place.

25. The method of claim 23, further comprising:
processing the final localization kit with a translation tool to create a machine-translated draft.

* * * * *